US011856216B2

(12) United States Patent
Filippov et al.

(10) Patent No.: US 11,856,216 B2
(45) Date of Patent: Dec. 26, 2023

(54) SIGNALING RESIDUAL SIGNS PREDICTED IN TRANSFORM DOMAIN

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/994,076

(22) Filed: Aug. 14, 2020

(65) Prior Publication Data
US 2021/0014509 A1    Jan. 14, 2021

Related U.S. Application Data

(63) Continuation of application No. PCT/RU2018/000205, filed on Mar. 29, 2018.

(51) Int. Cl.
*H04N 19/176* (2014.01)
*H04N 19/48* (2014.01)
(Continued)

(52) U.S. Cl.
CPC ............. *H04N 19/48* (2014.11); *H04N 19/13* (2014.11); *H04N 19/14* (2014.11);
(Continued)

(58) Field of Classification Search
CPC ...... H04N 19/48; H04N 19/13; H04N 19/176; H04N 19/645
See application file for complete search history.

(56) References Cited

U.S. PATENT DOCUMENTS 10,609,367 B2 *  3/2020  Zhao ................... H04N 19/176
2005/0179572 A1   8/2005  Winger
(Continued)

FOREIGN PATENT DOCUMENTS

CN        101895756 A      11/2010

OTHER PUBLICATIONS

Lakhani, "Modifying JPEG Binary Arithmetic Codec for Exploiting Inter/Intra-Block and DCT Coefficient Sign Redundancies," IEEE Transactions on Image Processing, vol. 22, No. 4, XP011498237, pp. 1326-1339, Institute of Electrical and Electronics Engineers, New York, New York (Apr. 2013).

(Continued)

*Primary Examiner* — Zhubing Ren
(74) *Attorney, Agent, or Firm* — Leydig, Voit & Mayer, Ltd.

(57) ABSTRACT

The present disclosure provides embodiments for coding and decoding signs of transform coefficients which is applicable, for instance, in image and/or video coding and decoding. In particular, a plurality of the signs are predicted and only a prediction error signal is embedded in the bitstream. The prediction error signal may have a distribution which can be efficiently coded with CABAC or another variable length (entropy) coding. Moreover, if adaptive multi-core transform is used, the context for the entropy code to code a transform coefficient sign is selected according to the transformation which was used to obtain the transform coefficient.

19 Claims, 15 Drawing Sheets

(51) Int. Cl.
| | |
|---|---|
| H04N 19/13 | (2014.01) |
| H04N 19/14 | (2014.01) |
| H04N 19/159 | (2014.01) |
| H04N 19/18 | (2014.01) |
| H04N 19/463 | (2014.01) |
| H04N 19/593 | (2014.01) |
| H04N 19/91 | (2014.01) |
| H04N 19/174 | (2014.01) |
| H04N 19/61 | (2014.01) |
| H04N 19/645 | (2014.01) |

(52) U.S. Cl.
CPC ......... H04N 19/159 (2014.11); H04N 19/174 (2014.11); H04N 19/176 (2014.11); H04N 19/18 (2014.11); H04N 19/463 (2014.11); H04N 19/593 (2014.11); H04N 19/61 (2014.11); H04N 19/91 (2014.11); H04N 19/645 (2014.11)

(56) References Cited

U.S. PATENT DOCUMENTS

| | | | |
|---|---|---|---|
| 2013/0044808 A1* | 2/2013 | Nakagawa | H04N 19/105 375/240.03 |
| 2013/0215961 A1* | 8/2013 | Nakagawa | H04N 19/126 375/240.03 |
| 2016/0007046 A1 | 1/2016 | Chou | |
| 2016/0295238 A1* | 10/2016 | Henry | H04N 19/184 |
| 2017/0142423 A1* | 5/2017 | Sun | H04N 19/593 |
| 2017/0142444 A1* | 5/2017 | Henry | H04N 19/154 |
| 2017/0142448 A1* | 5/2017 | Karczewicz | H04N 19/593 |
| 2018/0176582 A1* | 6/2018 | Zhao | H04N 19/619 |
| 2019/0208225 A1* | 7/2019 | Chen | H04N 19/18 |
| 2020/0195969 A1* | 6/2020 | Henry | H04N 19/48 |

OTHER PUBLICATIONS

Henry, "Residual Coefficient Sign Prediction," Joint Video Exploration Team (JVET) of ITU-T SG 16 WP 3 and ISO/IEC JTC 1/SC 29/WG 11, 4th Meeting: Chengdu, CN, XP030150258, JVET-D0031-v4, pp. 1-6, International Telecommunication Union, Geneva, Switzerland (Oct. 15-21, 2016).

Kazui et al., "Video coding technology proposal by Fujitsu," Joint Collaborative Team on Video Coding (JCT-VC) of ISO/IEC JTC1/SC29/WG11 and ITU-TSG.16, 1st Meeting: Dresden, DE, JCTVC-A115, XP030007555, pp. 1-23, International Telecommunication Union, Geneva, Switzerland (Apr. 15-23, 2010).

Po et al., "Transform-Domain Fast Sum of the Squared Difference Computation for H.264/AVC Rate-Distortion Optimization," IEEE Transactions on Circuits and Systems for Video Technology, vol. 17, No. 6, XP011182756, pp. 765-773, Institute of Electrical and Electronics Engineers, New York, New York (Jun. 2007).

Sullivan et al., "Overview of the High Efficiency Video Coding (HEVC) Standard," IEEE Transactions on Circuits and Systems for Video Technology, vol. 22, No. 12, XP055388661, pp. 1649-1668, Institute of Electrical and Electronics Engineers, New York, New York (Dec. 2012).

Ding et al., "CE11:SubTest 2 Context Simplification of Coefficient Entropy Coding," Joint Collaborative Team on Video Coding (JCT-VC) of ISO/IEC JTC1/SC29/WG11 and ITU-TSG. 16, 8th Meeting: San Jose, CA, USA, XP030111087, JCTVC-H0060, pp. 1-3, International Telecommunication Union, Geneva, Switzerland (Feb. 1-10, 2012).

"Information technology—High efficiency coding and media delivery in heterogeneous environments Part 2: High efficiency video coding," ISO/IEC 23008-2:2013, pp. 1-13, International Organization for Standardization, Geneva, Switzerland (Dec. 2013).

Chen et al., "Proposed improvements to Algorithm Description of Joint Exploration Test Model 1," Joint Video Exploration Team (JVET) of ITU-T SG 16 WP 3 and ISO/IEC JTC 1/SC 29/WG 11, 2nd Meeting: San Diego, USA, JVET-B0021, pp. 1-2, International Telecommunication Union, Geneva, Switzerland (Feb. 20-26, 2016).

"Series H: Audiovisual and Multimedia Systems; Coding of moving video; Implementors Guide for H.263 Video coding for low bit rate communication," pp. 1-10, International Telecommunication Union, Geneva, Switzerland (Aug. 5, 2005).

"Series H: Audiovisual and Multimedia Systems; Infrastructure of audiovisual services—coding of moving video, information technology, Generic coding of moving pictures and associated audio information: Video: Frame packing arrangement signalling for 3D content, Amendment 4," ITU-T Recommendation H.262, pp. 1-238, International Telecommunication Union, Geneva, Switzerland (Feb. 2012).

"Line Transmission of Non-Telephone Signals, Video Codec for Audiovisual Services at px64 kbits," ITU-T Recommendation H.261, pp. 1-29, International Telecommunication Union, Geneva, Switzerland (Mar. 1993).

"Series H: Audiovisual and Multimedia Systems Infrastructure of audiovisual services, Coding of moving video, High efficiency video coding," ITU-T Recommendation H.265, pp. 1-692, International Telecommunication Union, Geneva, Switzerland (Feb. 2018).

"Series H: Audiovisual and Multimedia Systems, Infrastructure of audiovisual services, Coding of moving video, Advanced video coding for generic audiovisual services," ITU-T Recommendation H.264, pp. 1-812, International Telecommunication Union, Geneva, Switzerland (Apr. 2017).

Kazui et al., "Description of video coding technology proposal by Fujitsu," Joint Collaborative Team on Video Coding (JCT-VC) of ITU-T SG16 WP3 and ISO/IEC JTC1/SC29/WG11,1st Meeting: Dresden, DE, Document: JCTVC-A115, pp. 1-23 (Apr. 15-23, 2010).

Tian et al., "All-Zero Block-Based Optimization for Quadtree-Structured Prediction and Residual Encoding in High Efficiency Video Coding," IEICE Transactions on Fundamentals of Electronics Communications and Computer Sciences, vol. E96-A, No. 4, pp. 769-779, The Institute of Electronics, Information and Communication Engineers (Apr. 2013).

Dias et al., "Unified transform architecture for AVC, AVS, VC-1 and HEVC high-performance codecs," EURASIP Journal on Advances in Signal Processing, pp. 1-15, Springer (Jul. 11, 2014).

* cited by examiner

| $T_{VER}$ \ $T_{HOR}$ | $T_0$ | $T_1$ | ... | $T_N$ |
|---|---|---|---|---|
| $T_0$ | $CTX_{00}$ | $CTX_{01}$ | ... | $CTX_{0N}$ |
| $T_1$ | $CTX_{10}$ | $CTX_{00}$ | ... | $CTX_{1N}$ |
| ... | ... | ... | ... | ... |
| $T_N$ | $CTX_{N0}$ | $CTX_{N1}$ | ... | $CTX_{NN}$ |

Look-Up Table to select contexts for residual signs predicted in transform domain

Fig. 12

SIGNALING RESIDUAL SIGNS PREDICTED IN TRANSFORM DOMAIN

CROSS-REFERENCE TO RELATED APPLICATIONS

This application is a continuation of International Application No. PCT/RU2018/000205, filed on Mar. 29, 2018, which claims priority to International Application No. PCT/RU2018/000142, filed on Mar. 7, 2018. All of the aforementioned patent applications are hereby incorporated by reference in their entireties.

TECHNICAL FIELD

Embodiments of the present disclosure relate to the field of image processing such as still image and/or video image encoding and decoding.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

SUMMARY

Embodiments of the disclosure are defined by the features of the independent claims and further advantageous implementations of the embodiments by the features of the dependent claims.

According to some embodiments, different contexts are used for entropy coding (encoding/decoding) of sign prediction errors subject to horizontal and vertical transforms selected from a transform set provided by a multiple core transform technique. In particular, different transforms may be associated with respective different contexts.

According to an aspect, an apparatus for encoding an image block including processing circuitry configured to: predict (1320) a sign of a transform coefficient obtained by transforming (1300) an image block signal with one of a plurality of transformations; determine (1340) a sign prediction error indicating whether or not the sign was correctly predicted; select (1360) a context for entropy coding of the sign prediction error according to the one of the plurality of transformations; and encode (1380) the sign prediction error by applying entropy coding using the selected context.

According to an aspect, an apparatus is provided for decoding an image block from a bitstream, the apparatus including processing circuitry configured to: predict (1420) a sign of a transform coefficient to be inverse transformed to obtain an image block signal with one of a plurality of transformations; select (1440) a context for entropy decoding of the sign prediction error indicating whether or not the sign was correctly predicted according to the one of the plurality of transformations; decode (1460) the sign prediction error by applying entropy decoding using the selected context; and determine (1480) the sign of the transform coefficient based on the predicted sign of the transform coefficient and the decoded sign prediction error of the transform coefficient.

Adaption of entropy coding context to the transformation used for obtaining the coefficients of which the signs are predicted and residuals coded with the entropy code may improve efficiency of the entropy coding and thus also efficiency of image coding which applies the sign prediction.

In an exemplary implementation, the processing circuitry is further configured to select (1360) the context based on an unsigned value of the transform coefficient.

In addition, since the sign prediction efficiency may depend on the coefficient magnitude, providing different contexts depending on unsigned coefficient value(s) may further improve the efficiency of entropy coding and thus also image coding.

Moreover, the processing circuitry can be further configured to:
predict (1320) a sign for each of M transform coefficients, M being an integer larger than 1 and smaller than a number of transform coefficient obtained by transforming (1300) the image block;
determine (1340) a sign prediction error for each of the M transform coefficients;
divide the M transform coefficients into two lists, the lists being divided from each other by means of a threshold such that a first list includes the transform coefficients having absolute values greater than the threshold and a second list includes the transform coefficients having absolute values equal to or below the threshold;
select (1360) a context for entropy coding of a sign prediction error of a transform coefficient of the M transform coefficients according to whether the transform coefficient of the M transform coefficients belongs to the first list or the second list; and
encode (1380) the sign prediction error of the transform coefficient of the M transform coefficients by applying entropy coding using the respective selected contexts.

In an alternative implementation, the first list includes the transform coefficients having absolute values equal or greater than the threshold and the second list includes the transform coefficients having absolute values below the threshold.

Predicting all coefficients may cause considerable complexity increase especially because of the sign bit hypotheses testing. The complexity increase may occur on both encoder and decoder side. Accordingly, it may be advantageous to limit the complexity by only predicting M transform coefficient signs. In some embodiments, signs of M largest coefficients are predicted, which is advantageous because the largest coefficients can be, in general, predicted more reliably.

For example, the processing circuitry is further configured to select (1360) the context based on whether a prediction type of the image block is intra or inter prediction. In an additional or alternative example, the processing circuitry is further configured to if a prediction type of the image block is intra prediction, select (1360) the context based on the intra prediction mode used to predict the image block. In particular, the processing circuitry is further configured to:

predict the image block using DC intra-prediction mode or planar mode; and select (1360) the context based on whether or not the image block is predicted using DC intra-prediction mode or planar mode.

Since the sign prediction efficiency may depend on the size of the coefficients which may substantially differ for residuals obtained using intra prediction (and also particular intra mode) and inter prediction, respectively. Thus, adapting the context based on the type of the prediction may provide further efficiency increase.

In particular, the processing circuitry is further configured to: predict (1320) the sign of the transform coefficient based on a cost function including estimating a discontinuity along the boundary of the image block; and select (1360) the context based on the number of block sides or number of neighboring pixels available for the estimating of the discontinuity along the boundary of the image block.

For example, the processing circuitry is further configured to select (1360) the context based on the ratio of edge pixels available for estimating discontinuity to the total number of pixels belonging to the image block. For instance, the processing circuitry is further configured to select (1360) the context based on whether or not the image block is located at the left or top boundary of a slice in which the image block is located.

The larger the number of neighboring pixels tested, the more precise (in general) the prediction, which may lead to an increase entropy coding efficiency.

In an exemplary implementation, the processing circuitry is further configured to predict (1320) the sign of a transform coefficient based on a cost function including transformed difference between adjacent pixels neighboring the transformed image block and a prediction of the adjacent pixels calculated based on a prediction signal of the image block.

The adaption of context to the transformation may be particularly relevant for sign bit prediction based on cost function calculation in the transform domain. In such case, the transformation has a direct impact on the distribution of the sign prediction error.

According to an embodiment, each of the plurality of transformations is associated with one of a plurality of contexts, and the processing circuitry is further configured to select (1360) the context out of a plurality of contexts such that the one of the plurality of transformations is associated with the selected context.

In one exemplary implementation, the processing circuitry is further configured to: select (1360) a context for entropy coding of the sign prediction error according to the one of the plurality of transformations each associated with one of a plurality of contexts, wherein if the probabilities of predicted sign values of a first transformation of the plurality of transformations and a second transformation of the plurality of transformations differ by less than a predetermined value, the first transformation is associated with same context as the second transformation.

For example, the processing circuitry is further configured to predict (1320) a sign of a transform coefficient obtained by transforming (1300) an image block signal with one of a plurality of transformations, wherein the transformation (1300) includes a horizontal transformation and a vertical transformation; and the selection (1360) of the context is based on the combination of the horizontal transformation and the vertical transformation of the transformation.

In an example, each of the transformations of the plurality of transformations is a combination of a horizontal transformation and a vertical transformation, and the processing circuitry is further configured to select (1360) the context such that the combination of the horizontal transformation and the vertical transformation is associated with the selected context.

Separable transformation are easier to implement and may provide a more flexible tool for selecting the appropriate transformation.

For instance, the number of mutually different contexts of the combinations of the vertical transformations and the horizontal transformations is smaller than the number of the combinations of the vertical and horizontal transformations, and a first combination of a vertical transformations and a horizontal transformation is associated with a same context as a second combination a vertical transformations and a horizontal transformation.

The processing circuitry may be further configured to use CABAC for the entropy coding (1380).

According to an aspect, A method for encoding an image block including the steps of: predicting (1320) a sign of a transform coefficient obtained by transforming (1300) an image block signal with one of a plurality of transformations; determining (1340) a sign prediction error indicating whether or not the sign was correctly predicted; selecting (1360) a context for entropy coding of the sign prediction error according to the one of the plurality of transformations; and encoding (1380) the sign prediction error by applying entropy coding using the selected context.

According to an aspect, A method for decoding an image block from a bitstream including the steps of: predicting (1420) a sign of a transform coefficient to be inverse transformed to obtain an image block signal using one of a plurality of transformations; selecting (1440) a context for entropy decoding of the sign prediction error indicating whether or not the sign was correctly predicted according to the one of the plurality of transformations; decoding (1460) the sign prediction error by applying entropy decoding using the selected context; and determining (1480) the sign of the transform coefficient based on the predicted sign of the transform coefficient and the decoded sign prediction error of the transform coefficient.

In an exemplary implementation, the selection of the context (at the encoder and/or decoder) is based on an unsigned value of the coefficient.

Moreover, the method (encoding and/or decoding) prediction of a sign performed (at the encoder and/or decoder) for each of M transform coefficients, M being an integer larger than 1 and smaller than a number of transform coefficient obtained by transforming (1300) the image block; determine (1340) a sign prediction error for each of the M transform coefficients; divide the M transform coefficients into two lists, the lists being divided from each other by means of a threshold such that a first list includes the transform coefficients having absolute values greater than the threshold and a second list includes the transform coefficients having absolute values equal to or below the threshold; select (1360) a context for entropy coding of a sign prediction error of a transform coefficient of the M transform coefficients according to whether the transform coefficient of the M transform coefficients belongs to the first list or the second list; and encode (1380) the sign prediction error of the transform coefficient of the M transform coefficients by applying entropy coding using the respective selected contexts.

In an alternative implementation for both encoding and decoding (as well as encoder and decoder), the first list includes the transform coefficients having absolute values equal or greater than the threshold and the second list includes the transform coefficients having absolute values below the threshold. For example, the method (encoding and/or decoding) further selects (1360) the context based on whether a prediction type of the image block is intra or inter prediction. In an additional or alternative example, the processing circuitry is further configured to if a prediction type of the image block is intra prediction, select (1360) the context based on the intra prediction mode used to predict the image block. In particular, the method (encoding and/or decoding) can predict the image block using DC intra-prediction mode or planar mode; and select (1360) the context based on whether or not the image block is predicted using DC intra-prediction mode or planar mode.

In particular, the method (encoding and/or decoding) further predicts (1320) the sign of the transform coefficient based on a cost function including estimating a discontinuity along the boundary of the image block; and selects (1360) the context based on the number of block sides or number of neighboring pixels available for the estimating of the discontinuity along the boundary of the image block.

For example, the method (encoding and/or decoding) can select (1360) the context based on the ratio of edge pixels available for estimating discontinuity to the total number of pixels belonging to the image block. For instance, the method may select (1360) the context based on whether or not the image block is located at the left or top boundary of a slice in which the image block is located.

In an exemplary implementation, the method (encoding and/or decoding) predict (1320) the sign of a transform coefficient based on a cost function including transformed difference between adjacent pixels neighboring the transformed image block and a prediction of the adjacent pixels calculated based on a prediction signal of the image block.

According to an embodiment, each of the plurality of transformations is associated with one of a plurality of contexts, and the processing circuitry is further configured to select (1360) the context out of a plurality of contexts such that the one of the plurality of transformations is associated with the selected context.

In one exemplary implementation, the method (encoding and/or decoding) includes selection (1360) of a context for entropy coding of the sign prediction error according to the one of the plurality of transformations each associated with one of a plurality of contexts, wherein if the probabilities of predicted sign values of a first transformation of the plurality of transformations and a second transformation of the plurality of transformations differ by less than a predetermined value, the first transformation is associated with same context as the second transformation.

For example, the method (encoding and/or decoding) may predict (1320) a sign of a transform coefficient obtained by transforming (1300) an image block signal with one of a plurality of transformations, wherein the transformation (1300) includes a horizontal transformation and a vertical transformation; and the selection (1360) of the context is based on the combination of the horizontal transformation and the vertical transformation of the transformation.

In an example, each of the transformations of the plurality of transformations is a combination of a horizontal transformation and a vertical transformation, and the method (encoding and/or decoding) further selects (1360) the context such that the combination of the horizontal transformation and the vertical transformation is associated with the selected context.

For instance, the number of mutually different contexts of the combinations of the vertical transformations and the horizontal transformations is smaller than the number of the combinations of the vertical and horizontal transformations, and a first combination of a vertical transformations and a horizontal transformation is associated with a same context as a second combination a vertical transformations and a horizontal transformation.

The entropy coding (1380) may be CABAC (context-adaptive binary arithmetic coding).

According to an embodiment, a non-transitory computer readable medium is provided storing program including instruction which, when executed on a processor, perform all steps of the methods referred to above.

Details of one or more embodiments are set forth in the accompanying drawings and the description below. Other features, objects, and advantages will be apparent from the description, drawings, and claims.

BRIEF DESCRIPTION OF DRAWINGS

In the following embodiments of the disclosure are described in more detail with reference to the attached figures and drawings, in which:

FIG. 12 is an exemplary look-up table to select CABAC contexts to entropy encode/decode sign prediction errors if contexts for some combinations were merged;

DETAILED DESCRIPTION

Figure 1:
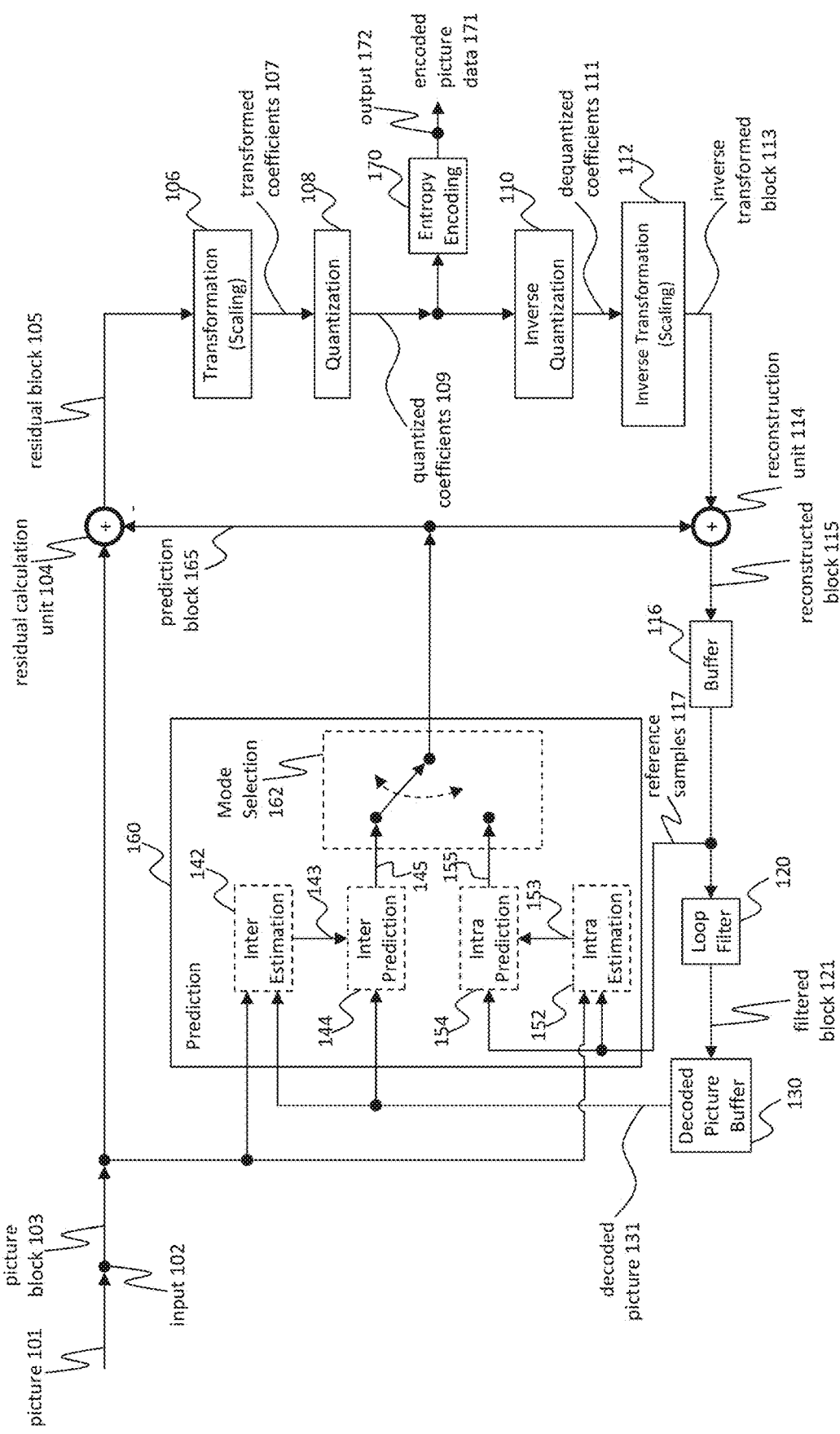
FIG. 1 is a block diagram showing an example of a video encoder configured to implement embodiments of the disclosure.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture, the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" (or correspondingly "image") is used to refer to a video picture (or correspondingly "video image") of a video sequence (as explained above) and/or to a still picture (or correspondingly "still image") to avoid unnecessary repetitions and distinctions between video pictures and still pictures, where not necessary. In case the description refers to still pictures (or correspondingly "still images") only, the term "still picture" (respectively "still images") shall be used.

In the following embodiments of an encoder 100, a decoder 200 and a coding system 300 are described based on FIGS. 1 to 3 before describing embodiments of the disclosure in more detail based on FIGS. 4 to 9.

Figure 3:
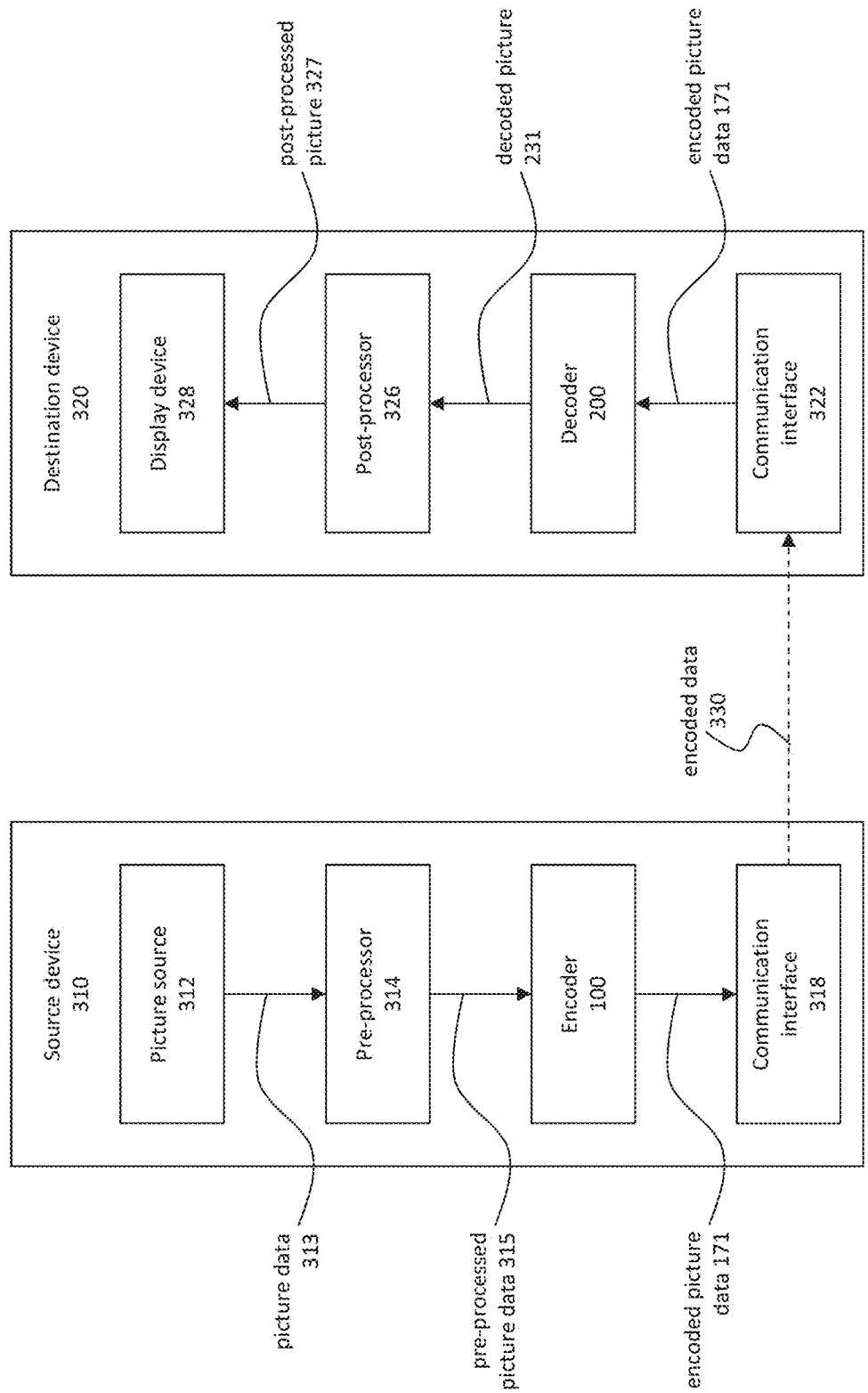
FIG. 3 is a block diagram showing an example of a video coding system configured to implement embodiments of the disclosure.

FIG. 3 is a schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318. The communication interfaces may be any interfaces such as Ethernet, WLAN, Bluetooth, LTE, or any wired or unwired interface such as satellite or optical interfaces. The transmission may be peer-to-peer or broadcast or multicast.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired (such as optical, power-line, cooper, coaxial, or based on any other media) or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display including beamer, hologram, or 3D/VR glasses.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments of the disclosure and embodiments of the disclosure are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like, and may use no or any kind of operating system.

Encoder and Encoding Method

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a decoded picture buffer (DPB) 130, a prediction unit 160 including an inter estimation unit 142, an inter prediction unit 144, an intra-estimation unit 152, an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
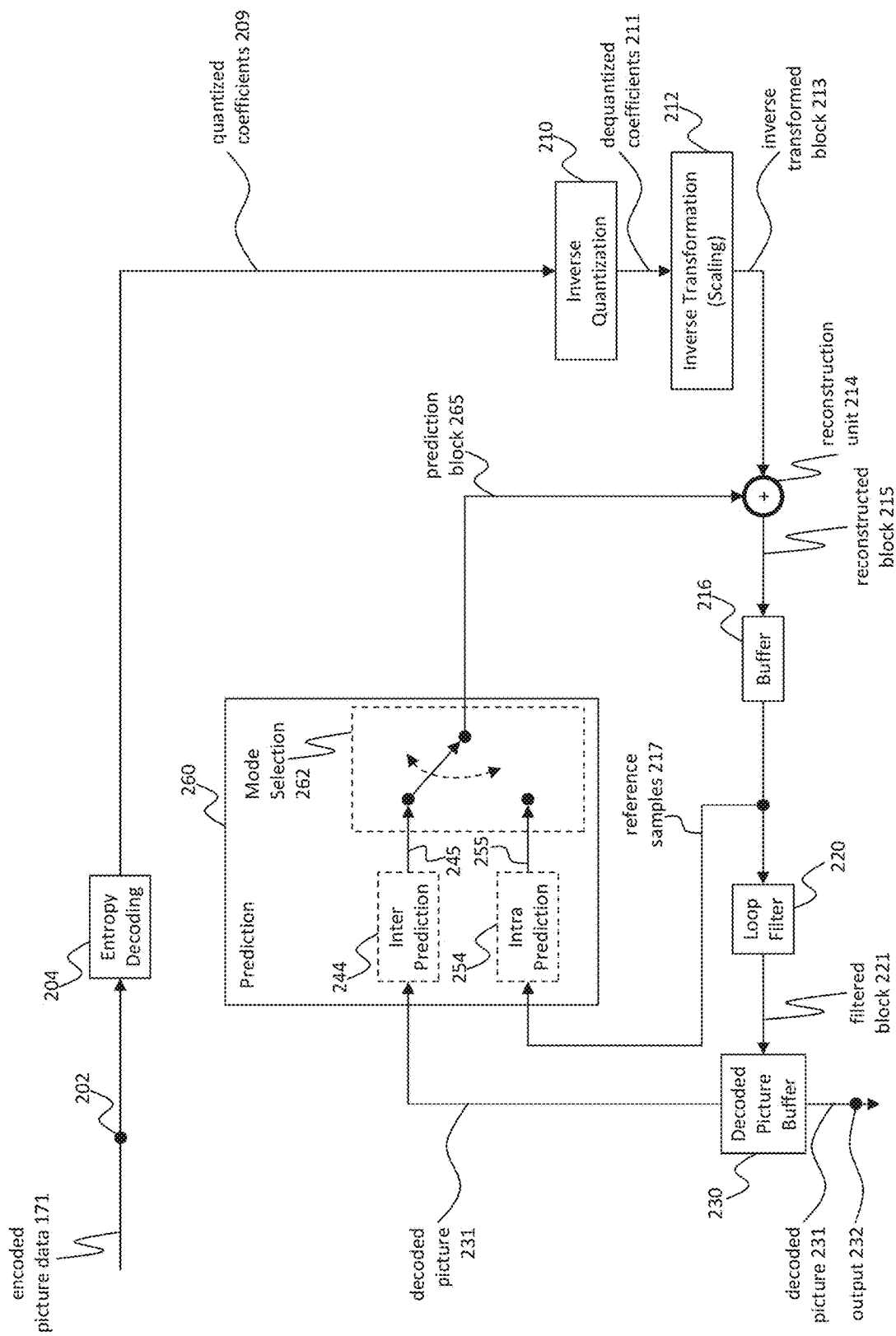
FIG. 2 is a block diagram showing an example structure of a video decoder configured to implement embodiments of the disclosure.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 116, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks hierarchically. The term block refers to a rectangular (not necessarily but possibly square) portion of image.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured to encode the picture 101 block by block, e.g. the encoding and prediction is performed per block 103.

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

The transformation unit 106 is configured to apply a transformation, e.g. a spatial frequency transform or a linear spatial (frequency) transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine (e.g. add) the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121. Other or further filet may be applied in the loop.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/subfilters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph. Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the disclosure may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 131 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 131, or at least one or a plurality of previously reconstructed blocks, e.g. reconstructed blocks of one or a plurality of other/different previously decoded pictures 131, for inter estimation (or "inter picture estimation"). E.g. a video sequence may comprise the current picture and the previously decoded pictures 131, or in other words, the current picture and the previously decoded pictures 131 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 144, both functionalities may be performed as one (inter estimation requires/comprises calculating an/the inter prediction block, i.e. the or a "kind of" inter prediction 144), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion (e.g. . . . ).

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation (typically/always) requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

FIG. 2 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 262 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 262 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an intra prediction unit 254, wherein the inter prediction unit 244 may be identical in function to the inter prediction unit 144, and the intra prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 231, e.g. via output 232, for presentation or viewing to a user.

As described in section 2.5.1 of J. Chen et al. "*Algorithm Description of Joint Exploration Test Model*1", *Joint Video Exploration Team (JVET) of ITU-T SG* 16 WP 3 and ISO/IEC JTC 1/SC 29/WG 11, JVET-B0021, 2nd Meeting: San Diego, USA, 20-26 February (incorporated herein by reference), along with residual sign prediction (RSP), further described below, a video codec could also comprise techniques of multiple core transform coding, i.e. techniques which enable selection of a transform core (base functions) out of a plurality of transform cores. Referring to the above described FIGS. 1 and 2, the multi-core transform may be implemented in the transformation unit 106 and inverse transformation unit 110 of the encoder 100, as well as in the inverse transformation unit 212 of the decoder 200, respectively. One of such techniques is Adaptive multiple Core Transform (further denoted as AMT). In addition to DCT-II and 4×4 DST-VII, which have been employed in HEVC, AMT scheme is used for residual coding for both inter and intra coded blocks. It utilizes multiple selected transforms from the DCT/DST families other than the current transforms in HEVC. The newly introduced transform matrices are DST-VII, DCT-VIII, DST-I and DCT-V.

The AMT applies to CUs smaller than 64×64, and whether AMT applies or not is controlled by a CU level flag for all transform units (TUs) within a CU. When the CU level flag is equal to 0, DCT-II is applied in the CU to encode the residue. For each TU within an AMT enabled CU, two additional flags are signaled to identify the horizontal and vertical transform to be used.

For intra residue coding, due to the different residual statistics of different intra prediction modes, a mode-dependent transform candidate selection process is used. Three transform sub-sets have been defined as shown in Table 1, and the transform subset is selected based on the intra prediction mode, as specified in Table 2.

TABLE 1

| Three pre-defined transform candidate sets | |
| --- | --- |
| Transform Set | Transform Candidates |
| 0 | DST-VII, DCT-VIII |
| 1 | DST-VII, DST-I |
| 2 | DST-VII, DCT-II |

With the sub-set conception, a transform subset is first identified based on Table 1 using the intra prediction mode for each TU when the CU-level flag is equal to 1. After that, for each of the horizontal and vertical transform (denoted as H and V in Table 2), one of the two transform candidates in the identified transform subset, according to in Table 2, is selected, for example, based on an explicitly signaled with flag. It is noted that this description relates to the AMT procedure.

In general, the present disclosure is applicable to any other way of signaling the transformation used to obtain the coefficients. For instance, Table 1 may include more or less different transformations and transformation sets. Signaling using Table 2 may also be replaces with another kind of signaling.

TABLE 2

| Selected (H)orizontal and (V)ertical transform sets for each Intra prediction mode | | | | | | | | | | | | | | | | | | |
| --- | --- | --- | --- | --- | --- | --- | --- | --- | --- | --- | --- | --- | --- | --- | --- | --- | --- | --- |
| Intra Mode | 0 | 1 | 2 | 3 | 4 | 5 | 6 | 7 | 8 | 9 | 10 | 11 | 12 | 13 | 14 | 15 | 16 | 17 |
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |
| Intra Mode | 18 | 19 | 20 | 21 | 22 | 23 | 24 | 25 | 26 | 27 | 28 | 29 | 30 | 31 | 32 | 33 | 34 | |
| H | 0 | 1 | 0 | 1 | 0 | 1 | 2 | 2 | 2 | 2 | 2 | 1 | 0 | 1 | 0 | 1 | 0 | |
| V | 0 | 1 | 0 | 1 | 0 | 1 | 0 | 0 | 0 | 0 | 0 | 1 | 0 | 1 | 0 | 1 | 0 | |

For inter prediction residual, however, only one transform set, which consists of DST-VII and DCT-VIII, is used for all inter modes and for both horizontal and vertical transforms.

Residual sign prediction could be performed in transform domain. If a codec uses several core transforms (e.g., in case of AMT) it operates with residual signal in several transform domains. Prediction of a transform coefficients sign should consider the transform domain to which the transform coefficient belongs to. Since the probability of prediction error depends on the core transform being used, the coding efficiency of Transform domain residual sign prediction (TD-RSP) could be adversely affected if no harmonization between core transform selection and sign prediction is provided.

As described above, some image and video codecs code quantized transformation coefficients. Non-zero transformation coefficients are signed, i.e. consist of an absolute value and either plus or minus sign. Coding of a sign for one coefficient requires one bit indicating either positive or negative sign. In other words, sign bit value 0 may indicate positive sign, while sign bit value 1 may indicate negative sign, or vice-versa.

State-of-the-art video coding standards do not use entropy coding of quantized transform coefficient signs. In H.264/AVC and H.265/HEVC, sign data is considered to be equiprobable (positive and negative signs occur with equal probability), and therefore, it is encoded in CABAC bypass mode. However, sign data can be predicted by analyzing discontinuities between reconstructed blocks. Signs of quantized transform coefficients that provide smaller discontinuity are more probable than those that increase discontinuity. Several methods are based on this statistical property such as K. Kazui et al. "*Video coding technology proposal by Fujitsu*" Contribution JCTVC-A115 to the 1st JCT-VC meeting, Dresden. Germany, April 2010 (referred to in the following as JCTVC-A 115) and US 2017/0142444 A1 (referred to in the following as U.S. '444), both incorporated herein by reference.

Figure 4:
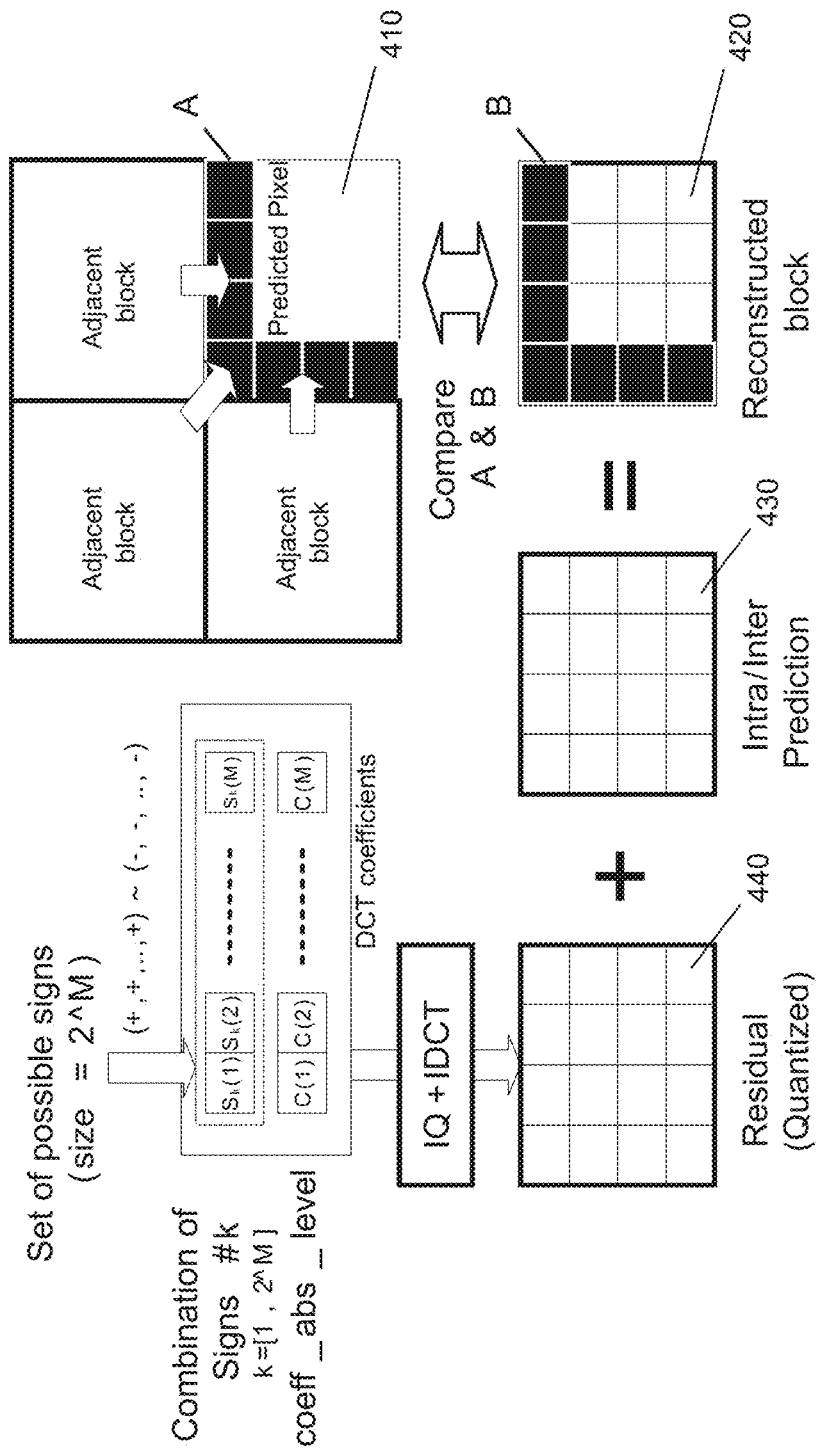
FIG. 4 is a schematic drawing of a sign prediction.

The technique of JCTVC-A115 is illustrated in FIG. 4. It estimates the signs of transform coefficients of a current block 410 from pixels in neighboring blocks (adjacent blocks previously processed, i.e. coded or decoded, in this example blocks on the top, top-left and left hand side of the current block 410) and encodes the difference (0: same, 1: not same) between the estimated signs and original signs by CABAC. If the signs are well estimated (predicted), the difference tends to be zero, and the coding efficiency can be improved by CABAC.

Generally, there is high correlation among the pixels A at the boundary of the current block 410 and the pixels at the same boundary, on the side of the neighboring blocks. This property is used to predict the signs of the transform coefficients in the current block 410. Assuming that there are M non-zero coefficients ($C(1), C(2), \ldots, C(M)$) signs of which are to be predicted in the current block 410, the number of possible combinations K of these signs ($SK(1), SK(2), \ldots, SK(M)$) is $2^M$. The combinations range from $(+, +, \ldots, +)$ to $(-, -, \ldots, -)$. In this example, the transform coefficients are DCT (discrete cosine transform) coefficients. The coefficients are determined including their absolute value of level (unsigned value, i.e. magnitude) and a combination K of signs. They are inverse transformed into pixel domain and dequantized (i.e. scaled and rounded), which results in a quantized block of residuals 440 (prediction error). The prediction error 440 in pixel domain is added to the prediction block 430 to obtain reconstructed block 420. The reconstructed boundary pixels B at the upper boundary and the left boundary of the current block 410 are compared with pixels A extrapolated from the neighboring blocks (indicated by arrows in FIG. 4). This is performed for all combinations of K. The combination K of signs which minimizes a square error between pixels A and B is defined as the estimated signs. Minimizing sum of absolute differences may also be applied.

Figure 5:
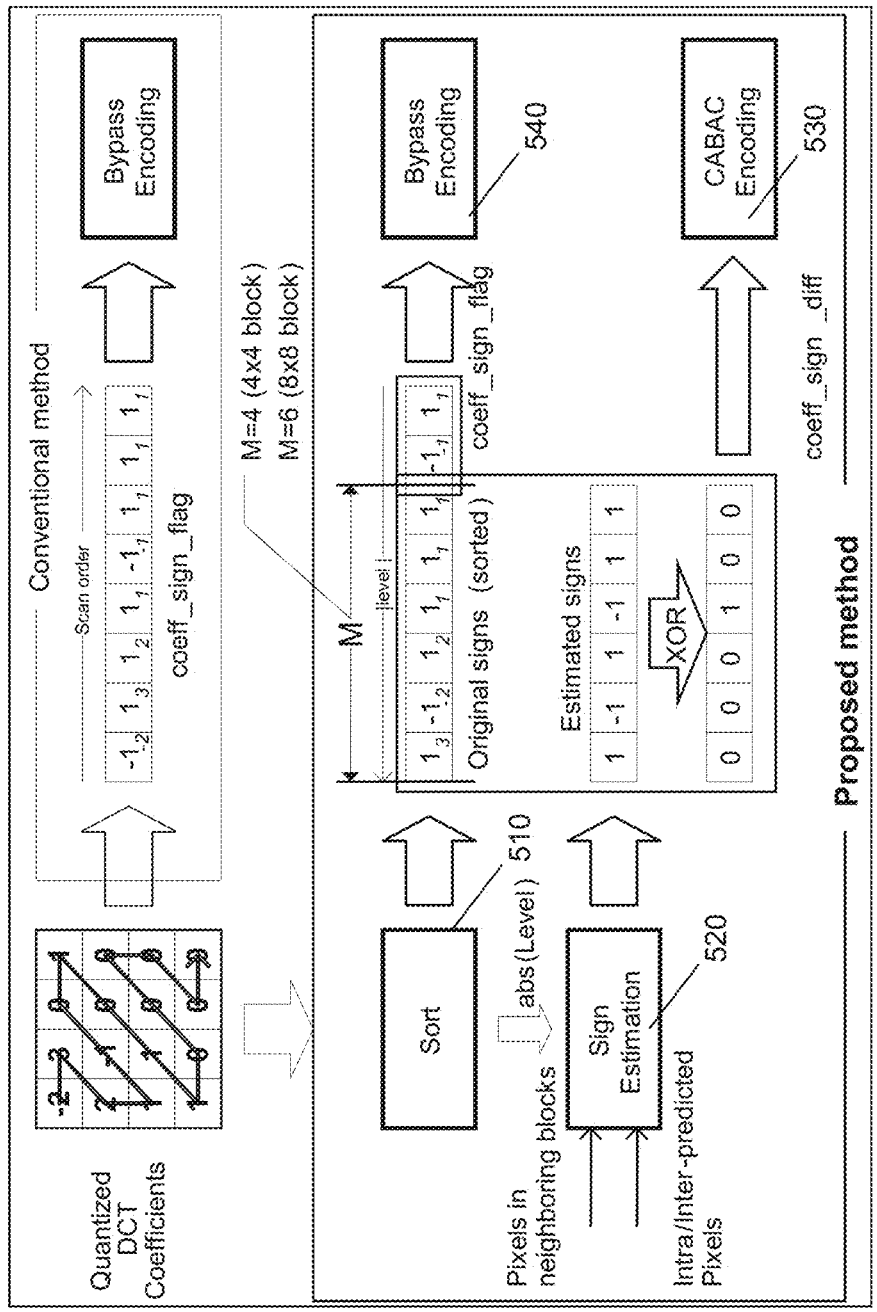
FIG. 5 is a schematic drawing comparing the sign coding in H.264/AVC and sign prediction.

Comparison of the method proposed in JCTVC-A115 with the conventional H.264/AVC sign coding is shown in FIG. 5 and the particular steps performed by the method of JCTVC-A115 are summarized in Table 3 below.

TABLE 3

| | | steps of a method for coefficient sign prediction and coding |
|---|---|---|
| 1 | Sorting of coefficients 510 | Coefficients (to be predicted and coded) are sorted by their absolute value of level to obtain sequence 3, −2, 2, 1, 1, 1, −1, 1. The coefficients are at first quantized and scanned (i.e. serialized, in this example by a zig-zag scan) to obtain sequence of coefficients −2, 3, 2, 1, −1, 0, 1, 0, 1, 1, 0, . . . Sorting by the amplitude is not only way. It could be sorted by the index of the coefficient in zig-zag or by other coefficient parameter. |
| 2 | Sign estimation 520 | Signs of the sorted coefficients (1, −1, 1, 1, 1, 1) are estimated as illustrated in FIG. 4 and described above to obtain (1, −1, 1, −1, 1, 1). In addition, there is a limitation of maximum number of signs to be estimated. Up to the first M signs in the sorted coefficients are estimated. For example, M is equal to 4 for a 4 × 4 block and 6 for a 8 × 8 block. The reason of this limitation is that the estimation result of a sign of coefficient with small level tends to be wrong. Computational complexity may be further reduced by reusing (intermediate) results of previous calculations. |
| 3 | Entropy coding 530 | Exclusive OR (XOR) operation is performed to the first $M^{th}$ signs of the sorted coefficients and their estimated values resulting in (0, 0, 0, 1, 0, 0). This result, coeff_sign_diff is encoded using CABAC encoding. Other signs are encoded directly, using the bypass encoding 540 of CABAC (i.e. encoding process of coeff_sign_flag). |

As can be seen in the top part of FIG. 5, the conventional H.264/AVC approach coded all signs by CABAC bypass coding.

Figure 6:
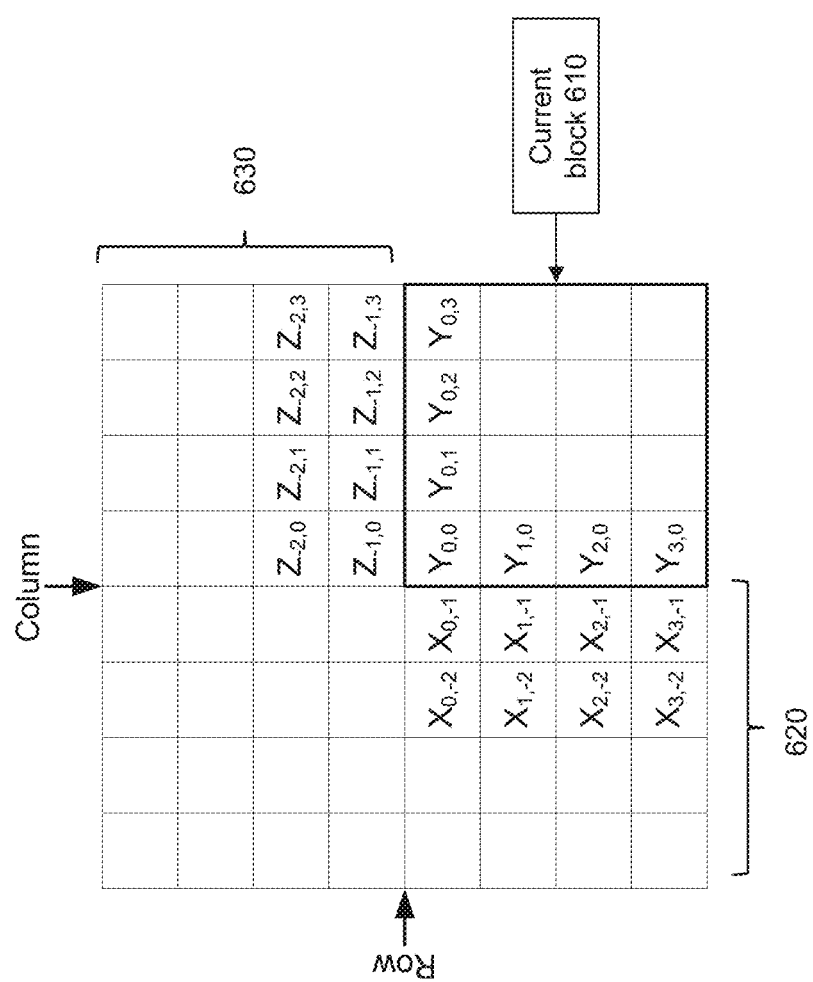
FIG. 6 is a schematic drawing illustrating the current block and the surrounding adjacent pixels.

FIG. 6 shows a detail view of the current block 610 and the pixels 630 on the top of the current block 610 and the pixels 620 on the left hand side of the current block 610. Pixels 630 and 620 belong to the adjacent blocks.

In spatial (pixel) domain, cost function F is defined as follows:

$$F = \sum_{n=0}^{N-1} |2X_{n,-1} - X_{n,-2} - Y_{n,0}| + \sum_{m=0}^{M-1} |2Z_{-1,m} - Z_{-2,m} - Y_{0,m}| \quad \text{[Equation 1]}$$

where N and M are height and width of the block, respectively. As can be seen from Equation 1, the cost function F has a low value, if the pixel values $Y_{i,0}$ and $Y_{0,j}$ with i=0 . . . N and j=0 . . . M have similar values as the pixels in two rows ($Z_{1j}$ and $Z_{2j}$) and columns ($X_{i,-2}$ and $X_{i,-1}$) in the adjacent blocks closest to the boundary with the respective adjacent blocks.

The techniques proposed in the above summarized documents involve inverse transform to perform sign estimation, because the differences of pixel values are used to calculate the cost function value F for a given set of signs determined by a hypothesis being checked (the hypothesis corresponding to a particular combination K). Despite of the presence of fast estimation methods, transition to space domain is still computationally expensive and is considered to be a major drawback of these methods.

In view of this the present disclosure provides some embodiments which may provide reduction of the number of operations needed to perform the sign prediction. This may be achieved by calculating cost estimation in the transform domain instead of calculating it in spatial domain.

In particular, according to an embodiment, an apparatus is provided for decoding an image block including processing circuitry configured to: predict signs of a plurality of coefficients of a transformed image block based on a cost function including transformed difference between adjacent pixels neighboring the transformed image block and prediction of the adjacent pixels calculated based on a prediction signal of the image block; and to reconstruct the signs of the plurality of coefficients according to the predicted signs.

It is noted that the plurality of coefficients may be a limited number M of non-zero coefficients. As described above, the M coefficients may be M coefficients with the highest magnitude among the coefficients of the current block. However, the present disclosure is not limited thereto and the M coefficients may simply be the M first non-zero coefficients in the current block in a predetermined order. The predetermined order may be the scanning order which may be predetermined by defining it in a standard or defining in a standard a set of scanning orders which are configurable, for instance, by signaling within the bitstream or implicitly derivable from some different parameters in the bitstream such as prediction mode or the like. Alternatively, the scanning order may be completely signaled in the bitstream. The coefficients are typically already quantized coefficients, in case quantization is applied to them.

Thus, contrary to FIG. 4 discussed above, prediction signal 430 is not added to the reconstructed residual 440, but instead, it is subtracted from the neighboring pixel values, since no inverse transform is performed and thus reconstructed residual signal 440 is not used. Specifically, instead of performing inverse transform of residual signal to obtain reconstructed boundary pixels, forward transform is performed over the difference between pixels adjacent to the current block and pixels of prediction signal of the current block extrapolated to the area of the neighboring pixels.

Moreover, according to an exemplary implementation, the cost function includes a sum of squared transformed differences between the adjacent pixels neighboring the transformed image block and the prediction of the adjacent pixels calculated based on a prediction signal of the image block.

Employing a square norm has an advantage resulting from the Parseval identity. According to Parseval identity, a sum of squared differences (SSD) calculated in the transform domain for an orthogonal transforms (such as discrete cosine transform (DCT) and discrete sine transform (DST)) should give the same result as the SSD calculated in spatial (pixel) domain. Hence the coding efficiency of the proposed technique should not be less than the efficiency of the techniques described above with reference to the JCTVC-A113 and U.S. '444.

Since the sign prediction is performed in transform-domain, the above embodiment may have significantly lesser computational complexity due to elimination of the calculations required to perform the inverse transform. Consequently, an implementation of this embodiment may be hardware-friendly and does not require additional RAM and ROM memory buffers. Moreover, the forward transform module 106 for performing the transformation can be reused. Just a single fetch of the boundary pixels from the line buffer is required.

According to an embodiment, the sign prediction error is also coded with a CABAC context model instead of employing an equiprobable sign value coding (bypass). However, the sign estimation procedure to be performed on both encoder and decoder sides in a similar way, is performed differently as the procedure described with reference to FIGS. 4 and 5 above.

Figure 7:
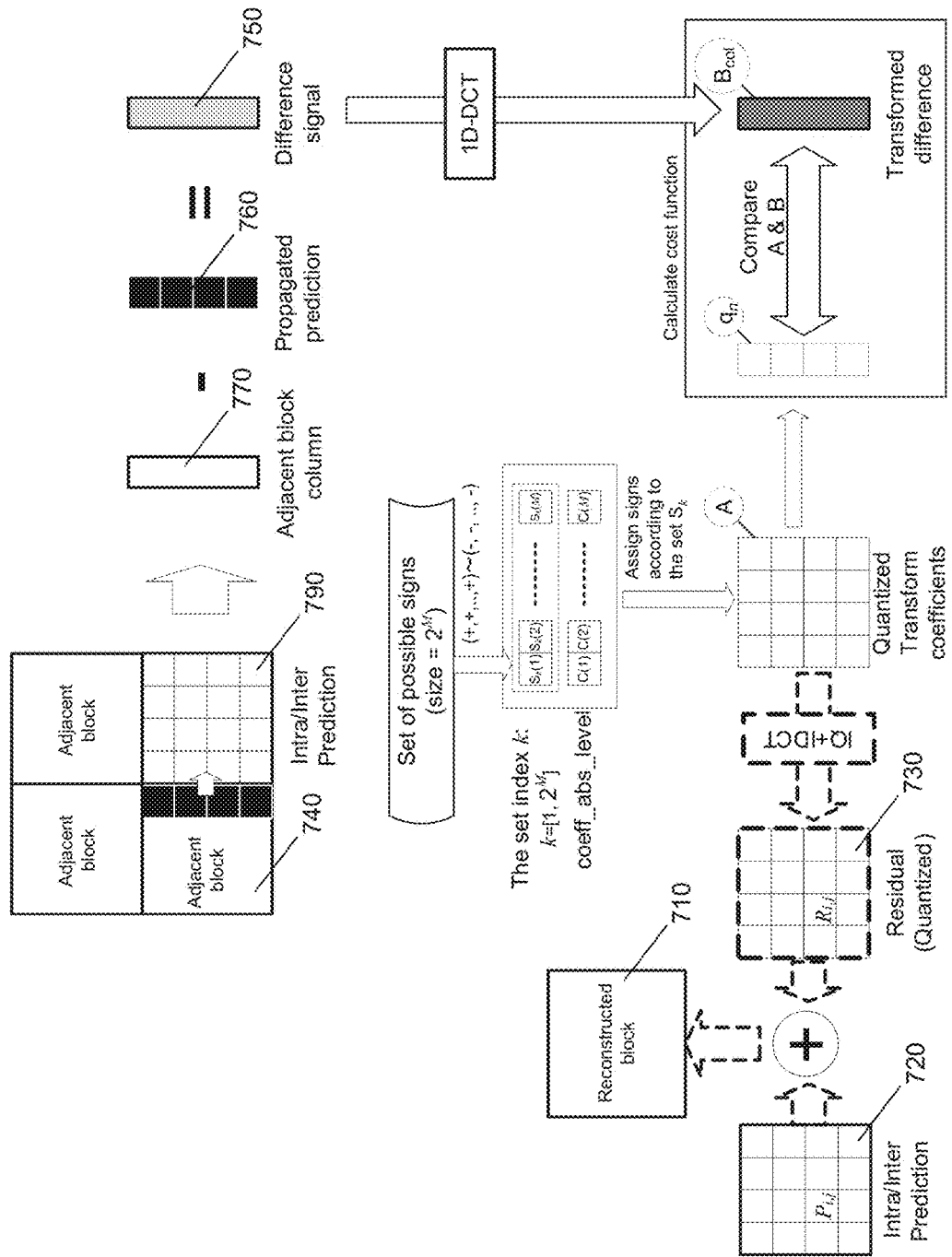
FIG. 7 is a schematic drawing comparing known sign prediction using cost function calculation in pixel domain and an embodiment using cost function calculation in the transform domain.

A schematic drawing of an exemplary implementation of the above mentioned embodiment can be seen in FIG. 7. The following are the particularities of this implementation:

The sign prediction is performed in transform-domain, and

The prediction signal is propagated into adjacent block area instead of reconstructing the current block and subtracting its boundary pixels from the corresponding pixels of adjacent blocks.

For the sake of simplicity, only column of the adjacent block is being considered in FIG. 7.

Depending on the framework where the present embodiment is applied, upper row, right column or even bottom row could be also used. In other words, the sign prediction may use any available boundary pixels. In the examples described above it is assumed that the available blocks are top, left and top-left blocks. This corresponds to the assumption that the processing order of blocks goes from left to right and from top to bottom as is usual in the current codecs. In general, at the decoder, any previously decoded neighboring blocks (in the order of decoding) may be used. Correspondingly, at the encoder, any previously encoded neighboring locks may be used.

In one implementation of the embodiment, the cost function F is redefined to use squares of pixel differences instead of modulus (sum of absolute differences):

$$F = \sum_{n=0}^{N-1} (2X_{n,-1} - X_{n,-2} - Y_{n,0})^2 + \sum_{m=0}^{M-1} (2Z_{-1,m} - Z_{-2,m} - Y_{0,m})^2 \quad \text{[Equation 1a]}$$

where N and M is height and width of the block and the definition of X, Y and Z remains the same as described with reference to FIG. 6.

A reconstructed block 710 consists of prediction 720 and residual 730 parts:

$$Y_{i,j} = P_{i,j} + R_{i,j},$$

Where $P_{i,j}$ is prediction pixel on position i, j, and $R_{i,j}$ is a prediction error pixel (residual) on position i, j.

In this case we can rearrange components in Equation 1a as follows:

$$F = \sum_{n=0}^{N-1}([2X_{n,-1} - X_{n,-2} - P_{n,0}] - R_{n,0})^2 + \sum_{m=0}^{M-1}([2Z_{-1,m} - Z_{-2,m} - P_{0,m}] - R_{0,m})^2$$

Let us denote:

$$T_n = [2X_{n,-1} - X_{n,-2} - P_{n,0}],$$

$$V_m = [2Z_{-1,m} - Z_{-2,m} - P_{0,m}],$$

$$Q_n = R_{n,0} \text{ and } O_m = R_{0,m}$$

According to Parseval identity, function F of Equation 1a can be rewritten in transform domain as the following Equation 2:

$$F = \sum_{n=0}^{N-1}(T_n - Q_n)^2 + \sum_{m=0}^{M-1}(V_n - O_n)^2 = = \sum_{n=0}^{N-1}(t_n - q_n)^2 + \sum_{m=0}^{M-1}(v_m - o_m)^2.$$

In Equation 2 above:

$$t_n = \text{Trans1D}(T_n),$$

$$q_n = \text{Trans1D}(Q_n),$$

$$v_n = \text{Trans1D}(V_n), \text{ and}$$

$$o_n = \text{Trans1D}(O_n),$$

wherein Trans1D(·) is a one-dimensional orthogonal transform.

As a result, the cost function can be calculated, and therefore, signs of the quantized transform coefficients can be predicted in transform domain.

In order to determine relation between $q_n$, $o_n$ and the two-dimensional transformation of the residuals $r_{n,m} = \text{Trans2D}(R_{n,m})$, let us write out the relation between $R_{n,m}$ and $r_{n,m}$ in a general form:

$$R_{n,m} = \sum_{k=0}^{N-1} W_N^{n,k} \sum_{l=0}^{M-1} W_M^{m,l} r_{k,l}$$

where $W_N^{n,k}$ is a transform core (base function). For example, the base functions for a two-dimensional DCT (DCT2) are as follows:

$$W_N^{n,k} = \frac{1}{\sqrt{N}} \cos\left(\frac{\pi(2n+1)k}{2N}\right) \begin{cases} 1, k = 0 \\ \sqrt{2}, k > 0 \end{cases}$$

Moreover, the following Equations 3 define the residual of the column of the current block at the boundary with the neighboring block in the pixel domain ($Q_n$) and the transform domain ($q_k$), respectively:

$$Q_n = R_{n,0} = \sum_{k=0}^{N-1}\sum_{l=0}^{M-1} W_M^{0,l} r_{k,l}$$

$$q_k = \sum_{n=0}^{N-1} W_N^{n,k} R_{n,0} = \sum_{l=0}^{M-1} W_M^{0,l} r_{k,l}$$

The first equation above is an inverse transform of $r_{k,l}$ that restores $Q_n$ pixels (by definition of $Q_n$). Transform core W is orthogonal here, i.e. forward (second equation) and inverse transform (first equation) coincide. An 1D transformation of $Q_n$ (first equal sign) does not need to be performed: Physically, $q_k$ is an inverse 1D transform of $r_{k,l}$ (the second equal sign).

In case of $o_n$ (a column) and $r_{n,m}$ there will be similar relations. In particular, $q_k$(row coefficients) correspond to $W^{0,1}_{rk,l}$, and $o_n$ (column coefficients) correspond to $W^{m,0}_{rk,l}$. Correspondingly, the zero-index merely changes its position in case of o when compared to $q_k$.

Accordingly, the above cost function F in Equation 2 may be calculated fully in frequency domain. Based thereon, the prediction of the signs of the plurality of coefficients is calculated.

In the apparatus for decoding the image block, the processing circuitry may be further configured to: parse from a coded stream sign prediction error, and reconstruct the signs including adding to the predicted signs the parsed sign prediction error.

FIG. 7 shows comparison of the approach described above with reference to FIG. 4. In particular reference signs 710, 720, and 730 correspond to the respective signs 420, 430, and 440 and denote reconstructed lock, prediction block, and residual block, respectively. As also in FIG. 1, the residual block is obtained by taking a K-th hypothesis (sign combination) of M signs for transformation coefficients of a block A and then by inverse transforming and dequantizing the coefficients with the signs (block IQ+IDCT).

In order to avoid such inverse transformation and inverse quantization for every tested hypothesis, FIG. 7 illustrates the approach of the present embodiment. In particular, the coefficients of block A (corresponding to column $q_n$ at the boundary of block A to the adjacent block 740) are compared with the transformed difference column $B_{col}$. The transformed difference column $B_{col}$ (corresponding to $t_n$) is obtained by subtracting propagated prediction signal 760 from the adjacent block column 770 obtaining difference signal 750 in the pixel domain and by transforming the difference signal 750 into the transformed differences. The transformation is any orthogonal transformation such as a transformation into a spectral domain, for example, a DFT, FFT, DCT or DST or their integer versions. The difference signal 750 corresponds to $T_n = [2X_{n,-1} - X_{n,-2} - P_{n,0}]$, in which the propagated prediction 770 from adjacent block is $(2X_{n,-1} - X_{n,-2})$ and the prediction 760 of block 790 is $P_{n,0}$. The propagated prediction 770 is obtained as extrapolated portion determined by the slope between $X_{n,-2}$ and $X_{n,-1}$, i.e. two columns on the boundary of the adjacent block.

Then, the comparison between A and B in FIG. 7 is performed by the following cost function in the transform domain:

$$F_{col} = \sum_{n=0}^{N-1}(t_n - q_n)^2$$

As can be seen from the above cost function, it corresponds to the cost function F in Equation 2 above, but is limited to its column part based on the left neighboring block, omitting the row part based on the top neighboring block. This is only an example for simplicity of explanation. As is clear to those skilled in the art, any neighboring block may be used for comparison in an analogous way.

In general, according to this embodiment, the processing circuitry is further configured to predict the signs of the plurality of coefficients of a transformed image block including:

calculating the transformed difference B between the adjacent pixels 770 neighboring the transformed image block and the prediction 760 of the adjacent pixels calculated based on a prediction signal P of the image block 790;

calculating cost function F comprising a sum of squared transformed differences between said transformed difference B and the transformed image block A determined according to each hypothesis K of the signs $S_K(i)$, $i=0..M-1$, out of a set of hypotheses $K=1..2^{\wedge}M$;

select as the predicted signs that hypothesis K of the signs which minimizes the cost given by the cost function F (corresponding to predicted signs=arg $\min_K F$).

For example, the transformed image block A is reconstructed by adding the hypothesis of the signs $S_K(i)$ to coefficients C(i) parsed from a coded bitstream. This is used for testing the K hypotheses to find the best one which minimizes the cost function. That hypothesis becomes the predicted signs for the block A. Moreover, in order to obtain the signs for block A, the predicted signs are then added to sign prediction error which may be decoded from the bitstream using Context-Adaptive Binary Arithmetic Coding, CABAC.

As already explained above, in a particular exemplary implementation, the cost function F is given by:

$$F = \sum_{n=0}^{N-1}(t_i - q_n)^2 + \sum_{m=0}^{M-1}(v_m - o_m)^2,$$

with $t_n=\text{Trans1D}(T_n)$, $q_n=\text{Trans1D}(Q_n)$, $v_n=\text{Trans1D}(V_n)$, and $o_n=\text{Trans1D}(O_n)$, wherein $\text{Trans1D}(\cdot)$ is a one-dimensional orthogonal transform and $T_n=[2X_{n,-1}-X_{n,-2}-P_{n,0}]$, $V_m=[2Z_{-1,m}-Z_{-2,m}-P_{0,m}]$, $Q_n=R_{n,0}$ and $O_m=R_{0,m}$, wherein P is prediction signal, and X and Y are neighboring pixels, N and M being height and width of the block in which the signs are predicted, respectively.

Figure 8:
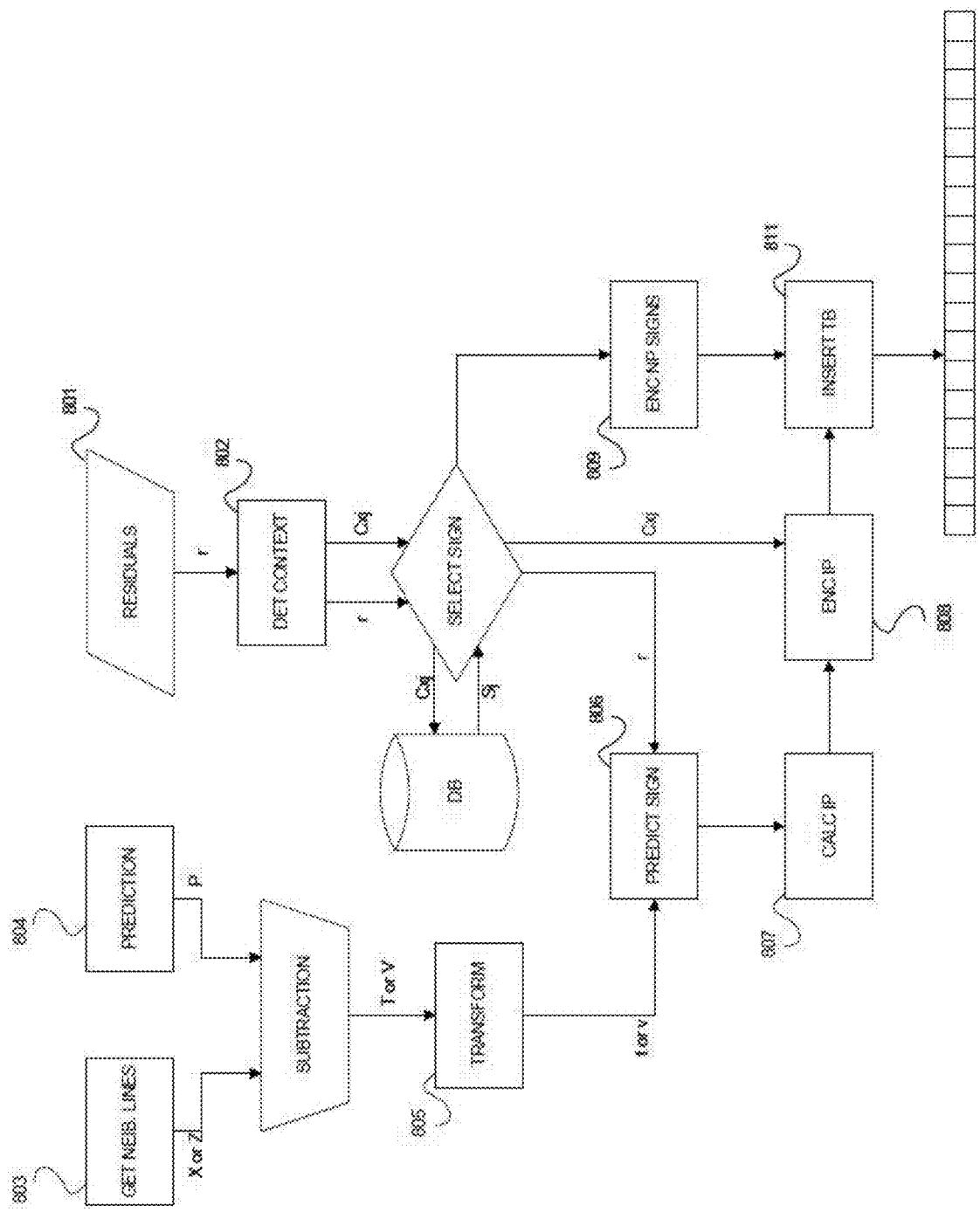
FIG. 8 is a flow diagram illustrating processing of transformation coefficients in connection with the sign prediction and encoding.

It is noted that the adjacent pixels may located at a horizontal and a vertical boundary of the image block. The vertical boundary may be the left or right boundary and the horizontal boundary may be the top boundary. This is beneficial, if the adjacent blocks on the top and to the left (and/or right) are already decoded when processing (decoding) the current block. However, the present disclosure is not limited to such embodiments. In general, one or more adjacent blocks which are already decoded (and are thus available) when decoding the current block may be used to predict the signs. Then, the cost function F includes the corresponding smoothness check of the current block pixels with respect to those boundary pixels from the respective available adjacent blocks. [01%] FIG. 8 shows a flowchart of an encoding according to an embodiment. FIG. 8 further includes the context selection within residual sign prediction process and the entropy coding (cf. block 808) and embedding into the bitstream (cf. bock 811).

Quantized transform coefficients 801 corresponding to the transformed and quantized residuals are used by a context determination process 802 which operates similarly as described in U.S. '444.

The U.S. '444 provides further details relating to sign estimation. For instance, it shows a different method to encode predicted signs than Step 3 of Table 3 above. This modification is implemented by introduction of two lists of predicted signs (modification of Step 1 of Table 3). Predicted signs belonging to these two lists are encoded with different CABAC contexts. The following rules are specified to populate these lists:

First list is populated with signs of coefficients having magnitude greater than a predefined threshold $T_1$. Total number of signs in the first list is constrained by pre-defined value M;

If the number of signs in the first list n is lesser than M, the second list is being populated. Total number of signs in the second list is constrained by (M−n), so that the total number of signs in both lists does not exceed M. Coefficients populating the second list are sorted by their position in raster order, the magnitudes should not be greater than $T_1$.

Context to encode the sign is determined on whether it belongs to the first or to the second list (difference in Step 3 of Table 3).

Context to encode the sign prediction error is determined on the list that the sign belongs to. Result of this process 802 is a set of candidate positions of the coefficients and contexts $Cx_j$ associated with these coefficient positions. After that, a special mechanism such as the one of U.S. '444 selects for which of the positions belonging to the set sign prediction is performed (i.e. the M coefficients for sign prediction are selected). For those positions that were not selected, conventional sign encoding process 809 is performed. In the other case (for the selected M coefficients), sign prediction is performed 806 according to FIG. 7 and Equations 2 and 3 as has been described above.

In particular, in order to predict signs 806, the reconstructed pixels of neighbour blocks are required. Pixels of the prediction signal of the currently reconstructed block 804 are subtracted from neighbour pixels provided by a neighbour pixels fetching process 803. A 1D transformation 805 provides $t_n$ and $v_m$ to be used in Equation 2. Prediction of transformed residual signs 806 includes calculation of $q_n$ and $o_n$ according to Equation 3 and obtaining value of cost function by Equation 2.

Calculations in transform domain are computationally easier, because not all the available coefficients of $t_n$ and $v_m$ are used to calculate the cost function. Instead, the method uses only several coefficients that belong to the specific row and/or specific column. This row and column are corresponding indices of a position of a coefficient, the sign of which is being predicted. A set of signs that minimizes the cost function of Equation 2 is generated by cost calculation block 807. Sign prediction error is then calculated and corresponds to the difference between the real signs of the M coefficients and the predicted signs of the coefficients. The sign prediction error is entropy encoded with contexts $Cx_j$ in the process block 808. The resulting bits are combined with the result of conventional sign encoding 809 and embedded into the bitstream in the process of 811.

In other words, in addition to the decoder, an apparatus is provided for encoding an image block including processing circuitry configured to predict signs of a plurality of coefficients of a transformed image block based on a cost function including transformed difference between adjacent pixels neighboring the transformed image block and prediction of the adjacent pixels calculated based on a prediction signal of the image block; and encode the signs of the plurality of coefficients according to the predicted signs.

The plurality of coefficients may correspond to the M coefficients mentioned above. The value of M may be fixed, or it may be given by the number of coefficients of which the magnitude exceeds certain threshold. It is further noted that the plurality M is less than all non-zero coefficients in the examples above. However, in principle, the sign prediction may also be applied to all non-zero signs. According to an advantageous implementation, the M coefficients for which the signs are predicted are the M coefficients with the largest magnitude among the non-zero coefficients of the current block.

The above mentioned encoding of the coefficients may be performed by determining sign prediction error as a difference between the signs of the plurality of coefficients and the predicted signs of the plurality of coefficients; and by then inserting into a coded stream including the coded image block the determined sign prediction error. The coded stream may be the bitstream also including image data of the current block as well as other signaling information concerning the mode in which the current block is coded, and/or further blocks of a still image or a video image.

As also described with reference to the decoding of the signs, the cost function of an embodiment includes a sum of squared transformed differences between the adjacent pixels neighboring the transformed image block and the prediction of the adjacent pixels calculated based on a prediction signal of the image block. In particular, in this embodiment, the encoding apparatus processing circuitry may be configured to predict the signs of the plurality of coefficients of a transformed image block including: calculating the transformed difference between the adjacent pixels neighboring the transformed image block and the prediction of the adjacent pixels calculated based on a prediction signal of the image block; calculating cost function comprising a sum of squared transformed differences between said transformed difference and the transformed image block reconstructed according to each hypothesis of the signs out of a set of hypotheses; and select as the predicted signs that hypothesis of the signs which minimize the cost given by the cost function.

The set of hypotheses is formed by combinations K of the M signs and may include all possible combinations (i.e. 2 power to M combinations). The encoder may further include processing circuitry to encode the remaining transformation coefficient signs other than the M signs by binary coding— positive sign with 1 and negative sign with 0 or vice versa.

The cost function F may also be given in the same way as at the decoder, namely by $$F = \sum_{n=0}^{N-1}(t_n - q_n)^2 + \sum_{m=0}^{M-1}(v_m - o_m)^2,$$

with $t_n$=Trans1D($T_n$), $q_n$=Trans1D($Q_n$), $v_n$=Trans1D($V_n$) and $o_n$=Trans1D($O_n$), wherein Trans1D(·) is a one-dimensional orthogonal transform and $T_n$=[$2X_{n,-1}-X_{n,-2}-P_{n,0}$], $V_m$=[$2Z_{-1,m}-Z_{-2,m}-P_{0,m}$], $Q_n=R_{n,0}$ and $O_m=R_{0,m}$, wherein P is prediction signal, and X and Y are neighboring pixels, N and M being height and width of the block in which the signs are predicted, respectively.

The processing circuitry of the encoder may be further configured to encode the sign prediction error using Context-Adaptive Binary Arithmetic Coding, CABAC. However, the present disclosure is not limited to employing CABAC. Instead any entropy coding that adapts the length of the codewords to the probability of the corresponding symbols to be encoded with the respective codewords such as CAVLC or any VLC coding.

According to an embodiment, an apparatus is provided for encoding an image block including processing circuitry configured to:
  predict 1320 a sign of a transform coefficient obtained by transforming 1300 an image block signal with one of a plurality of transformations;
  determine 1340 a sign prediction error indicating whether or not the sign was correctly predicted;
  select 1360 a context for entropy coding of the sign prediction error according to the one of the plurality of transformations; and
  encode 1380 the sign prediction error by applying entropy coding using the selected context.

The prediction of the sign(s) of a transformation coefficient(s) can be performed as is described above with reference to FIG. 6, namely based on cost function related to smoothness of transition of the block with predicted signs and its neighborhood. In general, the sign prediction corresponds to the most probable hypothesis, that is, the sign bit values minimizing the cost function (in particular minimizing the cost which may correspond to maximizing the smoothness and thus minimizing the difference between the block with predicted signs and the neighborhood). The cost function calculation may be performed in the frequency domain, which reduces the calculation complexity.

The image block may refer to the current image block of the current image, that is, the image block that is currently processed. The processing (encoding) described herein for a single image block may be applied on a block basis for each of the image blocks in the picture or for some of the image blocks in the picture.

It is noted that, in this description, the image block signal may be, for instance, a prediction error signal, corresponding to the residual block 105 in FIG. 1. In other words, the transformation is applied to residuals rather than directly to sample values. This is also a usual way of transform coding applied in several codecs such as H.264/AVC or H.265/HEVC. However, in general, the present disclosure is also applicable to transforming directly the picture blocks 103, i.e. samples of luminance and/or chrominance(s) or any other representation of the image block.

The sign prediction error indicating whether or not the sign was correctly predicted may be the difference between a sign prediction and the real sign of a transform coefficient. It may also be a binary value, for example, the value may be zero if the sign was predicted correctly (corresponding to zero difference between prediction and original sign), and one if the sign was not predicted correctly (corresponding to difference one between prediction and original sign), or the other way around. If the prediction works well, most of the time the sign prediction error will be equal to zero (in general to the value indicating that the prediction was correct). Accordingly, an entropy coding may be more efficient than fixed length coding.

The context selection may be performed based on an association between different transformations and respective contexts. For example, each of the plurality of transformations is associated with a single context. The association specifies for each transformation the context to be selected or to be used for the entropy coding of the corresponding transform coefficient. It is noted that the term "transform" and "transformation" are used as synonyms herein.

Furthermore, the context selection may be performed based on an association between different transformations and a respective plurality (set) of contexts. For example, each of the plurality of transformations may be associated with a respective plurality of contexts. The plurality of contexts is applicable if, in addition to the employed transformation, further parameters or criteria are used to determine the associated context. In particular, the context for entropy coding may then be selected from the respective plurality of contexts according to said further parameters or criteria. The association specifies for each transformation the plurality (the set) of contexts from which the context is to be selected (according to the further parameters) and used for the entropy coding of the corresponding transform coefficient.

Figure 11:
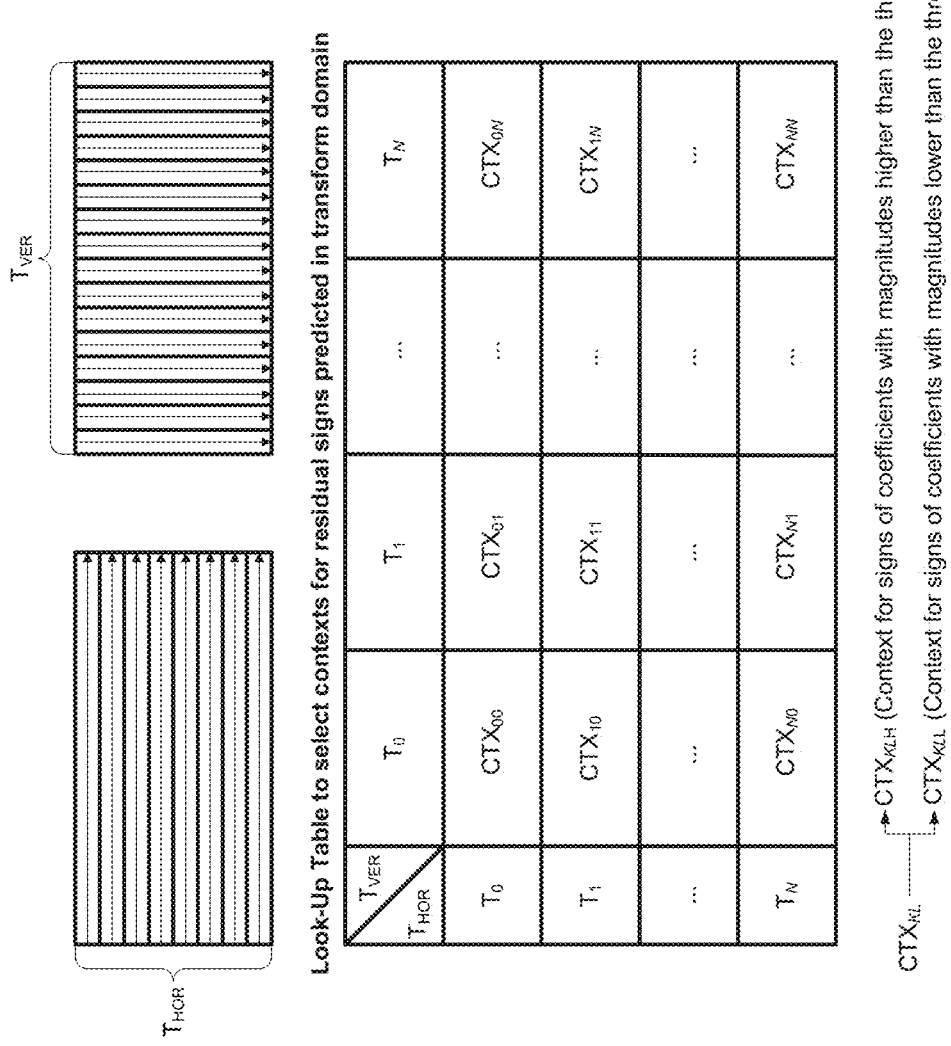
FIG. 11 is an exemplary look-up table to select CABAC contexts to entropy encode/decode sign prediction errors.

To implement the association, for example, a look-up table (LUT) can be used as shown in FIG. 11. In particular, FIG. 11 shows in the first row of the table N vertical transformations $T_0$ to $T_N$, N being an integer larger than 1. In the first column of the table, the same transformations $T_0$ to $T_N$ for horizontal transforming are shown. However, it is noted that the table may have number of rows different form the number of columns, and, in general, the horizontal and vertical transformations may be different. Cells of the table denoted as $CTX_{ij}$ (i and j representing integer index to the rows and columns of the table, respectively) may denote directly a context to be selected for the residual sign prediction error coding of an image block which has been transformed by a transformation. The context may be represented, for instance, by the probability p(1) of occurrence of 1 or by the probability p(0) of occurrence of 0, wherein p(0)+p(1)=1.

However, in some embodiments, the cells of the table do not directly include the context. Rather, $CTX_{ij}$ may be a pointer to a storage storing the context applicable. For example, $CTX_{ij}$ may be an index (integer number) which points to a context in a table stored in a memory. Such representation is advantageous especially in cases in which additional parameter, in addition to the transformation, is used to select the context for the coding of the residual prediction error. In particular, the pointer which is an index may point to a row of a first table and a row of a second table. The first table may be a table with contexts stored in association with the index value for a first value of the additional parameter. The second table may be a table with contexts stored in association with the index value for a second value of the additional parameter. Correspondingly, the pointer (index) $CTX_{ij}$ identifies context in a table of contexts and the additional parameter identifies the table of contexts. However, it is noted that the above examples are only some of the possible implementations. Alternatively, the additional one or more parameters may define pointer to a table and the table may be determined out of a plurality of tables corresponding to the respective transforms (e.g. combinations of vertical and horizontal transforms).

Figure 15:
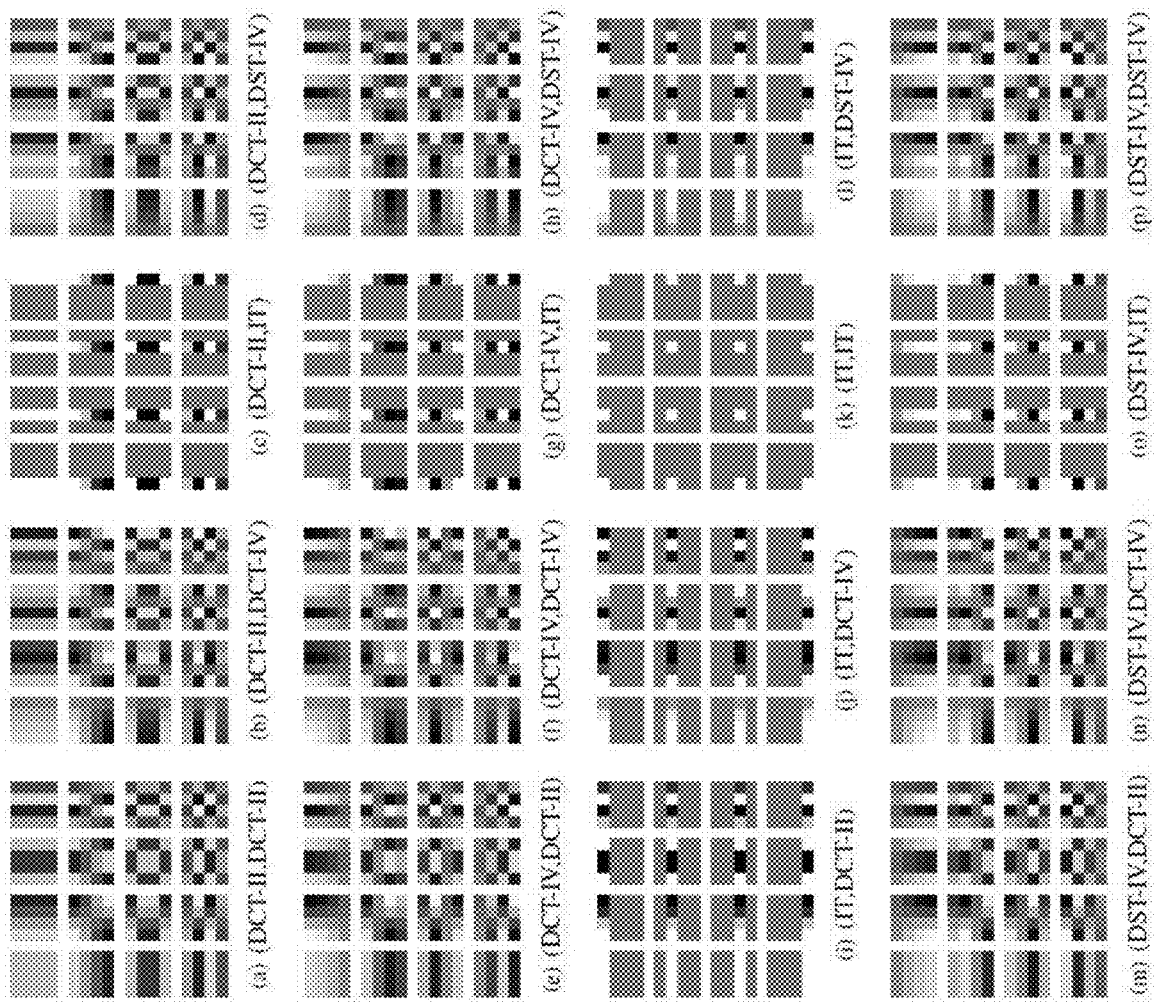
FIG. 15 is an example of basic functions, that is, different combinations of horizontal and vertical transformations, available for 4×4 blocks.

The transformation applied to image block to obtain its coefficients may be a combination of horizontal transformation $T_{HOR}$ and vertical transformation $T_{VER}$. On the top of the Table in FIG. 11, horizontal transformations (left hand side) and vertical transformations (right hand side) are illustrated. In particular, a horizontal transformation is applied to the rows, and a vertical transformation to the column of an image block. The effect of different combinations of horizontal and vertical transforms is illustrated in FIG. 15. FIG. 15 also shows some exemplary transforms which may belong to the above mentioned plurality of transforms such as DCT-II, DCT-IV, DST-IV and Identity Transformation (IT), in which each sample value of the input image is without change directly mapped to the corresponding sample value of the output image. However, the present disclosure is not limited to these transformations and further transformations such as discrete Fourier transformation (DFT) or fast Fourier transformation (FFT) or any of their integer forms may be used. Transformations shown in the above Table 1 may be used in addition or alternatively. In general, any transformations are applicable, such as orthogonal or orthonormal linear transformations. It may provide some advantages to apply separable 2D transformations, i.e. transformations which may be separated into horizontal and vertical transformations, which, when applied after each other, result in the 2D transformation. However, the present disclosure is not limited thereto and, in general, any 2D transformation may be used. In case of non-separable 2D transformations are applied, each of these transformations would be associated with a specific context set.

An entropy code assigns to more frequent source symbols shorter codewords. Such coding is efficient if the distribution of the source symbols is not uniform. In case of sign prediction error, the source symbols are either 0 or 1 representing correct and incorrect prediction of sign respectively. Context denotes the probability of 0 and 1. Since there are only two possible symbols, the context may be given by the probability of either 0 or 1 (as they sum up to 1).

The sign prediction error is entropy encoded/decoded using the selected context. In particular, but not exclusively, the Context-Adaptive Binary Arithmetic Coding (CABAC) engine may used for the entropy encoding/decoding with the selected context. Then, the CABAC context may be subject to a given combination of vertical and horizontal transforms belonging to Adaptive Multiple Transform (AMT)/Enhanced Multiple Transform (EMT) described above.

After completing the residual sign prediction step and obtaining a value of sign prediction error that indicates whether or not the sign of a quantized residual transform coefficient was correctly predicted, the following steps are performed in one exemplary implementation in order to obtain context to encode the sign prediction error:

Scanning neighbor pixels. This means that it is determined which pixels are available adjacent to the current block for which the signs are to be estimated, and they are provided for further processing.

Performing forward 1D transform of differential signal between line and/or column of neighboring pixels and predicted signal as described in the above embodiments. This transform corresponds to the transform used to obtain the coefficients.

Select coefficients within quantized residual signal where bits need to be predicted. This corresponds to the selection of M coefficients with M>1 and smaller than the number of non-zero coefficients in the block. Alternatively, all non-zero coefficients may be taken for sign prediction.

Check hypotheses on bit values (corresponding to coefficient signs) and encode the bit prediction error signal that corresponds to the most probable hypothesis.

Select a CABAC context subject to a given combination of vertical and horizontal transforms belonging to AMT/EMT, or in general select CABAC context for the transformation which was used to obtain the coefficients and to optimize the cost function for sign prediction.

Encode/decode the sign prediction error using the CABAC engine with the selected context.

According to an embodiment, the context is selected 1360 based on an unsigned value of the transform coefficient. In other word, the value of the unsigned transform coefficient determines the additional parameter mentioned above. It is noted that the context sensitive to transformation described in this embodiment is applicable in general to transform coefficients, irrespectively on whether or not (and how) they are quantized after transformation and whether or not they are obtained by transforming directly the image sample/pixel values or residuals. However, examples referring to HEVC and its developments may typically apply the transformation to the residuals.

The unsigned value may for instance be a value based on the norm of the transform coefficient or a value based on the absolute value of the transform coefficient.

According to an embodiment, the processing circuitry is further configured to: predict 1320 a sign for each of M transform coefficients, M being an integer larger than 1 and smaller than a number of transform coefficient obtained by transforming the image block; determine 1340 a sign prediction error for each of the M transform coefficients; divide the M transform coefficients into two lists, the lists being divided from each other by means of a threshold such that a first list includes the transform coefficients having absolute values greater than the threshold and a second list includes the transform coefficients having absolute values equal to or below the threshold; select 1360 a context for entropy coding of a sign prediction error of a transform coefficient of the M transform coefficients according to whether the transform coefficient of the M transform coefficients belongs to the first list or the second list; and encode 1380 the sign prediction error of the transform coefficient of the M transform coefficients by applying entropy coding using the respective selected contexts. In other words, if the coefficient pertains to list 1, the prediction error of its sign will be coded with context 1. If, on the other hand, the coefficient pertains to list 2, the prediction error of its sign will be coded with context 2. Context 1 and context 2 are already preselected by the transformation as explained above. For instance, the pointer to these contexts 1 and 2 is obtained according to the transformation.

The threshold is a predetermined or predefined threshold which may be included in standard. The threshold may be set empirically. Its purpose is to distinguish "natural" discontinuities (caused by a natural properties of the picture) from the "artificial" ones (in this case, caused by a wrong sign of transform coefficient). The threshold may be obtained, for example, by trying different values and observing their effect on the coding efficiency on a given picture database. The threshold is not necessarily defined as a constant value. It may be signaled within a bitstream at the picture level, e.g. in the sequence parameter set (SPS) or picture parameter set (PPS).

The above mentioned lists may be RSP lists as follow:
HP-list (high-probability list) is a list that includes positions of such quantized transform coefficients that have magnitudes higher than the threshold and, therefore, their signs can be correctly predicted with higher probability;
LP-list (low-probability list) is a list that includes positions of such quantized transform coefficients that have magnitudes lower than the threshold and, therefore, their signs can be correctly predicted with lower probability.

However, it is noted that there may be more than two lists.

Turning back to FIG. 11, for instance, using the indices of vertical $T_{VER}$ and horizontal THOR transforms, a pointer $CTX_{KL}$ (with K and L being indexes in the rows and columns of the table) from the 2D LUT may be fetched. This pointer $CTX_{KL}$ may provide access to two (possibly different) contexts $CTX_{KLH}$ and $CTX_{KLL}$ used to entropy encode/decode sign prediction errors for residual transform coefficients belonging to respective HP- and LP-lists. More general, the number of the contexts available through $CTX_{KL}$ is equal to the number of the RSP-lists. The pointer $CTX_{KL}$ may be used to select the context that corresponds to the RSP-list a residual transform coefficient belongs to.

In this embodiment, the signs of some transform coefficients obtained by transforming the image block are encoded in CABAC bypass mode. That is to say, a non-zero number of coefficients, smaller by at least 2 than the total number of coefficients obtained by transforming the image block is not entropy decoded (cf. also above description with reference to FIG. 8). The number of remaining transform coefficients, which are thus to be entropy encoded, is M. Accordingly, M is at least 2 and smaller than the total number of coefficients obtained by transforming the image block.

In general, there may be more than two lists. The transform coefficients may then be distributed over the lists according to the coefficient values. Accordingly, in this case, there may be several threshold values defining the corresponding ranges of unsigned coefficient values. For instance, transform coefficients larger than a first threshold may be included in a first list, transform coefficients smaller than a second threshold may be included in a second list, and the remaining transform coefficients may be included in a third list. According to this example, the selection of the context for the entropy coding of the transform coefficients may be based on whether the transform coefficient of the M transform coefficients belongs to the first list or the second list or the third list, in addition to being based on one of a plurality of transformations used to obtain the respective transform coefficient from the image block. In case of more than 2 lists, each transformation is associated with one context for each list, and each of these contexts is in turn associated with one of the lists. Thereby, each combination of a transformation and a list is associated with one context of at least two different contexts. In this case, the same context may have multiple combinations of transformations and lists that are associated with it. In particular, multiple combinations of the same transformation with different lists may be associated with the same context. Furthermore, multiple combinations of different transformations with the same list may be associated with the same context.

In summary, for each of the M transform coefficients, if the respective transform coefficient is in the first list a first context may be used; and if the respective transform coefficient is in the second list a second context may be used. Said first and second context are thereby preselected by the transformation used to obtain the respective transform coefficient from the image block. In other words, each transformation is associated with two contexts, each context in turn associated with one of the two lists. This is also illustrated below the LUT-Table of FIG. 11. The lists may be sorted according to the unsigned coefficient value (in ascendant or descendent order). It is noted that the term "list" here generally refers to a set of ordered (sorted) data.

According to an embodiment, the context is selected 1360 based on whether a prediction type of the image block is intra or inter prediction.

The selection criterion of this embodiment may be applied in addition or alternatively to the selection based on the above HP/LP-lists or other selection criteria. Thus, the CTX pointer may point to different tables of contexts for intra and inter prediction or to different tables for combinations of prediction type and pertinence to list 1 or list 2. For instance, in case of two list, a HP and a LP list, for each transformation the CTX pointer may point to four different tables, that is, each transformation may then be associated with four different tables with contexts.

This embodiment suggests selection of different context sets depending on whether a block is predicted using temporal (inter-frame) prediction (i.e. using different one or more frames) or intra-prediction (using neighboring pixels from the same picture as the predicted block). There are two reasons for such a distinction:

(i) Inter-predicted blocks have lesser quantized transform coefficients than intra-predicted ones since the inter-prediction in general produces better prediction.

(ii) Intra-predicted blocks use neighboring pixels for both purposes: to predict a block and to estimate discontinuity. Hence, inter-predicted blocks use additional input data to predict signs as compared to intra-prediction.

More specifically, the input data for reconstructing inter-block pixels comprises samples of the reference frame as well as the residual signal. The input data for reconstructing intra-block pixels, on the other hand, includes neighbor samples and the residual signal.

The discontinuity related to a sign hypothesis is estimated between neighbor and reconstructed pixels. In fact, for intra-predicted blocks, reconstructed pixels are predicted from the neighbor blocks, i.e. with those that are used to estimate discontinuity. This could lead to a biased estimation, because a signal is partially generated from the one being compared with.

In case of inter-prediction, neighbor pixels are not used to obtain prediction signal, but are used to estimate discontinuity. In that sense, inter-predicted blocks have more information (and less bias) as comparing to intra-predicted blocks.

According to an embodiment, if a prediction type of the image block is intra prediction, the context is selected 1360 based on the intra prediction mode used to predict the image block.

In this embodiment, the selection of the context for entropy coding of the sign prediction error is based on the employed intra prediction mode, that is, a different context may be selected for each different intra prediction mode the video codec specifies. In particular, a different context may be provided for each particular direction of intra prediction, DC intra prediction, plane and planar prediction mode, as well as a different context for each non-directional mode. In other words, the intra prediction mode used to predict the image block may be DC, planar, or directional with a particular direction, where every particular direction may be treated as a different intra prediction mode (implying a possibly different context to be selected).

The selection criterion of this embodiment may be applied in addition or alternatively to the selection based on the above HP/LP-lists or other selection criteria. Thus, the CTX pointer may point to different tables of contexts for each intra prediction mode. Such tables may look similar to Table 2 but be filled with contexts instead of transformation sets.

It is noted that alternatively, the combination of parameters such as LP/HP-list, inter-/intra-prediction and/or prediction mode (and/or possibly further parameters) may be listed as combinations associated with a pointer which then points to tables with context, one table per transformation. These are only two possible implementation, but in general, the association between parameters/parameter combinations with the respective contexts may be implemented in any way.

By specifying a context per intra prediction mode, the dependency of the sign prediction probability (SPP) on intra prediction mode can thus be taken into account.

According to an embodiment, the sign of the transform coefficient is predicted 1320 based on a cost function including estimating a discontinuity along the boundary of the image block; and the context is selected 1360 based on the number of block sides or number of neighboring pixels available for the estimating of the discontinuity along the boundary of the image block.

Thus, discontinuity is minimized by evaluating the cost function which corresponds to maximizing the smoothness.

In contrast to the previous example, it is worth noting that there are other partitioning frameworks where more than two sides can be available for intra/inter- and further sign prediction. For instance, the bottom and/or right block may be available in addition or alternatively to the above exemplified top and left blocks. Actually, the availability of the blocks depends on the processing order of the blocks within the image. In general, block coding (processing) order can be adaptively determined at the encoder side and signaled to the decoder. Thus, neighboring pixels for the coded blocks can be located on more than just two sides of a block. Moreover, some sides can be partially available for prediction. Hence, another possible embodiment considers selection of a context depending on the number of the block sides or, in general, on the number of neighboring pixels available for estimating discontinuity along the boundary of a current block. In particular, if hierarchical partitioning is applied, then one block can have one or even more neighboring blocks on one of its sides. For example an image block A with the size 16×16 may have on its left boundary two blocks with the size 8×8. On its top boundary, block A may have three neighbor blocks: one 8×8 block and two 4×4 blocks. Some of them may be available for prediction and/or cost function calculation but some of them are not necessarily available.

According to an embodiment, the context is selected 1360 based on the ratio of edge pixels available for estimating discontinuity to the total number of pixels belonging to the image block.

Partitioning information can also affect context selection process. For example, if a video codec uses quad-tree partitioning, resulting blocks being coded have a square shape. In this case two factors affect the probability: the size of a block and neighboring pixels availability. To consider both factors, this embodiment suggests using a ratio of edge pixels to the total number of pixels belonging to a block (edge-to-area ratio). Table 4 gives an example of computations of this ratio. In particular, if the current image block, i.e. block of which the signs are to be predicted, has a size of 16×16, and neighbors only available on one side (e.g. either left or top), then the number of pixels having neighboring pixels usable for prediction will be 16 while the number of pixels in the 16×16 block will be 256. The corresponding ratio is then 16/256 which results in approximately 0.06. On the other hand, if two sides of the block have neighboring pixels available for prediction, then the number of pixels having neighboring pixels usable for prediction will be 2×16-1 which is 31. The resulting ratio is then 31/256 which results in approximately 0.12. Similarly, Table 4 may be extended by rows assuming 3 or 4 sides with available neighboring pixels.

TABLE 4

Edge-to-area ratio

| Availability of neighboring pixels | Block size | | | |
|---|---|---|---|---|
| | 4 × 4 | 8 × 8 | 16 × 16 | 32 × 32 |
| Left or top sides | 4/16 | 8/64 | 16/256 ≈ 0.06 | 32/1024 ≈ 0.03 |
| Left and top sides | 7/16 | 15/64 ≈ 0.23 | 31/256 ≈ 0.12 | 63/1024 ≈ 0.06 |

Context selection may be performed by mapping this ratio value to a context index. An exemplary mapping is shown in Table 5. Table 5 shows association between the context index and the respective range of the edge-to-area ratio. Here, round bracket means that the range limit (e.g. 0, 0.1, 0.2, 0.3) is excluded from the range while the square bracket indicates that the range limit (e.g. 0.1, 0.2, 0.3, 0.5) are included in the range.

TABLE 5

Context selection according to edge-to-area ratio

| Context index | 0 | 1 | 2 | 3 |
|---|---|---|---|---|
| Edge-to-area ratio | (0; 0.1] | (0.1; 0.2] | (0.2; 0.3] | (0.3; 0.5] |

This embodiment is applicable not only to square blocks but for rectangular shapes as well.

For rectangular blocks, Table 4 may also additionally use aspect ratio, i.e. a width of a block divided by a height of the block. Edge-to-area value in this case will be selected based on one of the block sides' length (e.g., block width) and aspect ratio. Several mappings (as shown in Table 5) of edge-to-area ratio to context index may be defined, and corresponding mapping could be selected with respect to the aspect ratio value.

According to an embodiment, the context is selected 1360 based on whether or not the image block is located at the left or top boundary of a slice in which the image block is located.

In general, a slice is a part of image decodable independently from other slices in the same image. This is achieved by 1) restarting entropy coding at the beginning of the slice and 2) not using intra-prediction across slice boundary. Accordingly, in order to follow the design aim of providing slice independency, it may be advantageous not to perform the cost optimization for RSP across the slice boundary.

In particular, sign prediction is based on calculating cost estimation function. This function estimates discontinuity along the boundary of a current block. Obviously, it is possible to calculate cost estimation function only for the boundaries where neighboring pixels are available. The availability of neighboring pixels is determined by block coding order. For example, in case of z-order block scan a current block may have only left and top available neighboring pixels. Blocks aligned to the left or top side of a slice will have either left or top neighboring pixels unavailable. Therefore, for these blocks, a lesser number of pixels is used by cost estimation function, and consequently, these blocks will have lower probability of correct sign prediction.

In other words, even though there may be neighboring pixels for an image block, they will not be used if they belong to a slice different from the slice in which the image block is located. Accordingly, the context selection may consider the location of the image block at a slice boundary as an indication for the quality of prediction and thus for context selection.

This embodiment of context selection for sign prediction error utilizes this dependency. It is proposed to select different contexts for the blocks aligned to the left and top sides of a slice and the rest of the slice blocks.

According to an embodiment, the image block is predicted using DC intra-prediction mode or planar mode; and the context is selected 1360 based on whether or not the image block is predicted using DC intra-prediction mode or planar mode.

If a block has natural discontinuity (such as object edge, or textured region), its pixel values will be less correlated with neighboring pixels and therefore these blocks are more likely to be predicted using non-directional mode, i.e. DC or planar ones, which is used in this embodiment. Two dedicated contexts may be provided: One context is selected when a block is predicted in DC intra prediction mode, and the other one is selected when planar mode is in effect. Alternatively or in addition, if a video codec specifies more non-directional modes than just DC, plane and planar, additional context could be provided per each additional mode.

Alternatively the planar and DC intra prediction mode may use the same context (context 1, or a set 1 of contexts), which may be different from a context (context 2, or s set 2 of contexts) applied for directional interpolation.

According to an embodiment, the sign of a transform coefficient is predicted 1320 based on a cost function including transformed difference between adjacent pixels neighboring the transformed image block and a prediction of the adjacent pixels calculated based on a prediction signal of the image block. The transform domain optimization has been described in detail above with reference to FIGS. 4 to 8.

According to an embodiment, each of the plurality of transformations is associated with one of a plurality of contexts, and the context is selected 1360 out of a plurality of contexts such that the one of the plurality of transformations is associated with the selected context.

If further parameters or criteria are used to select the context, each of the plurality of transformations is associated with one of a plurality of sets of contexts. In particular, in this case, each of the plurality of transformations is associated with a set of contexts. The context is then selected out of said associated set of contexts based on the said further parameters or criteria.

For instance, as illustrated in FIG. 11, if further parameters are used to select the context, each of the plurality of transformations may be associated with a pointer.

According to an embodiment, a context for entropy coding of the sign prediction error is selected 1360 according to the one of the plurality of transformations each associated with one of a plurality of contexts, wherein if the probabilities of predicted sign values of a first transformation of the plurality of transformations and a second transformation of the plurality of transformations differ by less than a predetermined value, the first transformation is associated with same context as the second transformation.

The predetermined value is a design parameter affected by characteristics and the total number of transforms being used with the codec and properties of the entropy coder. Specifically the "window length", i.e. how many previously coded values are considered by the probability model of entropy encoder. The predetermined value may thus be pre-determined empirically testing various values with a database of training video sequences.

In further embodiments, several contexts are grouped together. Specifically, if a block is predicted using intra-prediction modes that are close to horizontal and vertical intra prediction modes, a joined context could be used (DC and planar grouped, several similar or all directional modes grouped etc).

Also the contexts that are selected from the cells shown in FIG. 12 are not mandatory unique. Several contexts could be merged into one in case probabilities of correct sign prediction are close to each other. In FIG. 12 this is shown by the cells (0,0) and (1,1) which share the same $CTX_{00}$ (which may be context or same pointer to the same context).

Hence, it is, for instance, not obligatory to have a separate pair of contexts for each combination of vertical and horizontal transforms. If the probabilities (e.g. $P_{kl}$ and $P_{mn}$) of guessed (predicted sign) values are close enough (less than E) for these combinations, the corresponding contexts can be merged:

$$abs(P_{kl}-P_{mn})<\varepsilon$$

Here the indices k, l, m and n label the corresponding horizontal and vertical transforms. Thus, $P_{kl}$ denotes the probability for the combination of the k-th horizontal with the l-th vertical transform.

However, the above formula is not limited to combinations of different horizontal and vertical transforms. Any two contexts with corresponding probabilities $$abs(P_i-P_j)<\varepsilon$$

for some sufficiently small value ε may be merged, wherein i and j are indices over different contexts, including contexts for transforms and/or other parameters.

The threshold value ε in the formula given above is determined by experiment, because its selection depends on various factors, including but not limited to: the total number of contexts used by a video codec, operating rate points (high bit-rate, middle bit-rate, low bit-rate), efficiency or other properties of the entropy encoder (specifically the "window length", i.e. how many previously coded values are considered by the probability model of the entropy encoder), the maximum number of signs that are predicted per block, etc. as also mentioned above.

According to an embodiment, a sign of a transform coefficient obtained by transforming 1300 an image block signal with one of a plurality of transformations, wherein the transformation includes a horizontal transformation and a vertical transformation is predicted 1320; and the selection 1320 of the context is based on the combination of the horizontal transformation and the vertical transformation of the transformation.

According to an embodiment, each of the transformations of the plurality of transformations is a combination of a horizontal transformation, and a vertical transformation, and the processing circuitry is further configured to: select 1360 the context such that the combination of the horizontal transformation and the vertical transformation is associated with the selected context.

Context selection for sign prediction error coding depends on the sign prediction probability (SPP), i.e. how frequently a sign is predicted correctly. Actually, the difference in SPP for different combinations of horizontal and vertical transforms causes the necessity to introduce additional (e.g., CABAC) contexts.

This instance is illustrated in FIG. 11. As illustrated, each combination of horizontal transformation and vertical transformation may be associated with a pointer as described above.

In general, however, the number of horizontal and vertical transforms may be different, and the horizontal and vertical transforms transformations may be different as well. To be explicit, the first row may run from $T_0$ to $T_N$, while the first column may run from $T'_0$ to $T'_M$.

According to an embodiment, the number of mutually different contexts of the combinations of the vertical transformations and the horizontal transformations is smaller than the number of the combinations of the vertical and horizontal transformations, and a first combination of a vertical transformations and a horizontal transformation is associated with a same context as a second combination a vertical transformations and a horizontal transformation.

The number $N_{CTX}$ of newly introduced contexts is calculated using the following inequality:

$$N_{CTX} \leq N_{RSP\_LISTS} * N_{TR\_COMB}$$

where $N_{RSP\_LISTS}$ is the number of RSP lists (in this particular case, $N_{RSP\_LISTS}=2$, i.e., different contexts for coefficients in the HP- and LP-list), $N_{TR\_COMB}$ is the number of possible combinations of available horizontal and vertical transforms (for example, $N_{TR\_COMB}=5$), and "*" denotes multiplication.

This is illustrated in FIG. 12, where the $(T_0,T_0)$ entry is identical to the $(T_1,T_1)$ entry $$CTX_{00}=CTX_{11}.$$

However, in contrast to FIG. 12, the number of vertical and horizontal transforms must not be identical. Furthermore, the horizontal and vertical transformations may be different (see above).

In the general case, that is, if further parameter or criteria are used to determine the associated context or select the context for entropy coding, the above formula may be extended by additional factors on the right hand side, the factors corresponding to number of values of further parameters used to determine the context.

According to an embodiment, Context-Adaptive Binary Arithmetic Coding (CABAC) is used for the entropy coding 1380. However, any context adaptive form of entropy coding, for instance, Context Adaptive Variable Length Coding (CAVLC) or a different kind of entropy coding (e.g., VLC), may be used.

According to an embodiment, an apparatus is provided for decoding an image block from a bitstream, the apparatus including processing circuitry configured to:
  predict 1420 a sign of a transform coefficient to be inverse transformed to obtain an image block signal with one of a plurality of transformations;
  select 1440 a context for entropy decoding of the sign prediction error indicating whether or not the sign was correctly predicted according to the one of the plurality of transformations;
  decode 1460 the sign prediction error by applying entropy decoding using the selected context; and
  determine 1480 the sign of the transform coefficient based on the predicted sign of the transform coefficient and the decoded sign prediction error of the transform coefficient.

The context for the entropy decoding of the sign prediction error is selected based on, or according to, the corresponding inverse transformation.

The corresponding inverse transformation may be the transformation used by a decoder to obtain an image block or image block signal from the transform coefficient. The corresponding inverse transformation may also be the inverse to the transformation that was used by an encoder to obtain the transform coefficient from an image block or image block signal. The context for the entropy coding of the sign prediction error may then be selected based on, or according to, said transformation used to obtain the transform coefficient from an image block.

The inverse transformation may be one of a plurality of inverse transformation. In general, a plurality of inverse transformation may be equivalent to a plurality of transformation, and vice versa. In particular, as in the case of different DCTs, a transformation may be the inverse transformation of another transformation.

Each of the plurality of transformations may be associated with one of a plurality of contexts. The context selected for entropy decoding is the respective context associated with the relevant transformation, which is the transformation pertaining to the coefficient the sign of which is to be entropy decoded.

In addition, other parameters or criteria may be used to determine (that is, select) the context for the entropy decoding. In this case, each of the plurality of transformations may be associated with a plurality of contexts. The specific context to be used for entropy decoding is selected from the plurality of contexts associated with the transformation based on or according to said other parameters or criteria.

The contexts associated with two different transformations may be different or the same (e.g., merged). In the case of pluralities of contexts, the pluralities of contexts associated with two different transformations may be different, the same (e.g., merged), or have overlapping contexts (i.e., only some identical contexts—not necessarily for the same other parameters or criteria).

The sign of the transform coefficient may be determined based on or according to the predicted sign of the transform coefficient and the decoded sign prediction error of the transform coefficient. That is, the decoded sign prediction error indicates whether or not the sign is predicted correctly. In conjunction with the predicted sign the correct sign of the respective corresponding coefficient may be inferred.

The apparatus provided by this embodiment may further comprise a circuitry configured to inverse transform the transform coefficients parsed from the bitstream together with their signs reconstructed as described above from the prediction error and prediction.

Figure 13:
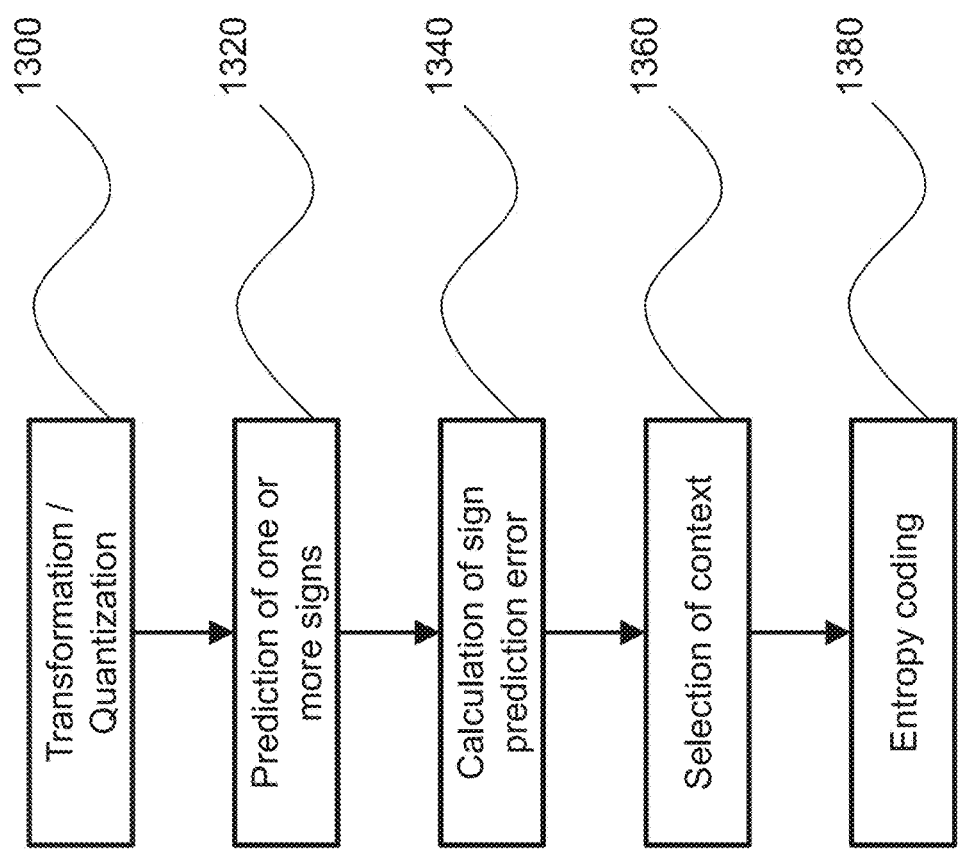
FIG. 13 is a flowchart of an encoding method according to the present disclosure.
Figure 14:
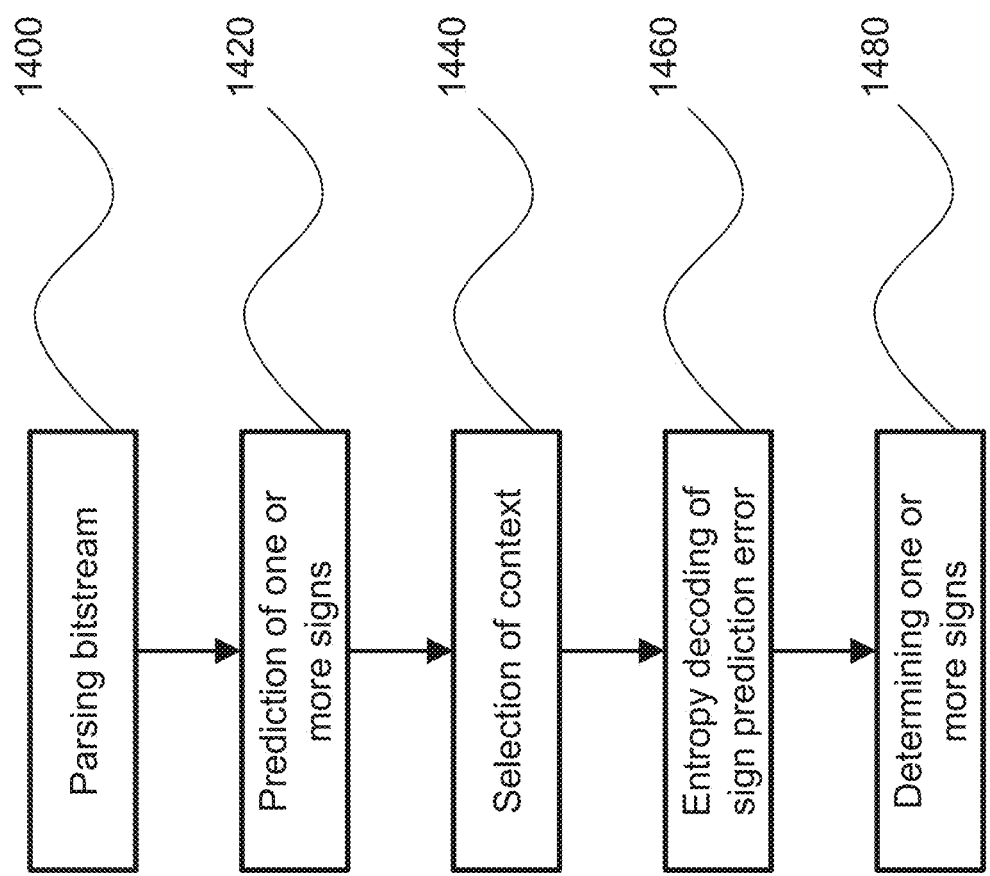
FIG. 14 is a flowchart of an decoding method according to the present disclosure.

FIGS. 13 and 14 illustrate steps of the methods for encoding and decoding the prediction error of the residual sign prediction. It is noted that the methods according to the present disclosure include all steps described above with reference to the processing circuitry.

In step 1300 of FIG. 13, the image block is first transformed and the transformation coefficients obtained by the transformation are quantized. The method for encoding an image block includes the steps of:
  predicting 1320 a sign of a transform coefficient obtained by transforming 1300 an image block signal with one of a plurality of transformations;
  determining 1340 a sign prediction error indicating whether or not the sign was correctly predicted;
  selecting 1360 a context for entropy coding of the sign prediction error according to the one of the plurality of transformations; and
  encoding 1380 the sign prediction error by applying entropy coding using the selected context.

Similarly, FIG. 14 shows a method for decoding an image block from a bitstream including the steps of:
  predicting 1420 a sign of a transform coefficient to be inverse transformed to obtain an image block signal with one of a plurality of transformations;
  selecting 1440 a context for entropy decoding of the sign prediction error indicating whether or not the sign was correctly predicted according to the one of the plurality of transformations;
  decoding 1460 the sign prediction error by applying entropy decoding using the selected context; and
  determining 1480 the sign of the transform coefficient based on the predicted sign of the transform coefficient and the decoded sign prediction error of the transform coefficient.

In step 1400, the bitstream is parsed. This parsing may include parsing from the bitstream the coded unsigned coefficient values. After the parting of the coefficient values, for instance, the LP-/HP-lists may be constructed and the corresponding signs coded as shown above.

Figure 9:
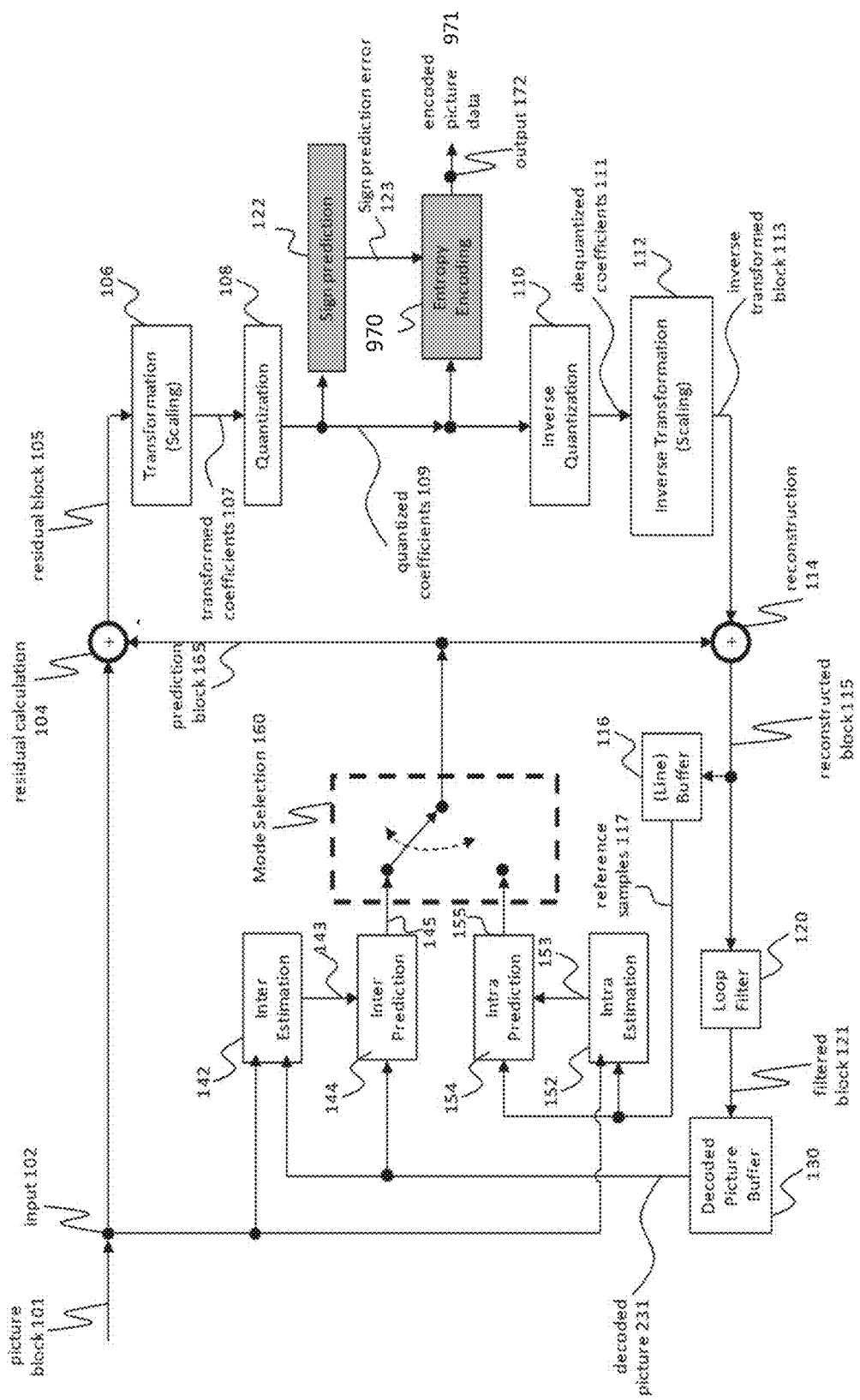
FIG. 9 is a block diagram illustrating an exemplary amendment of the encoder according to FIG. 1 to include the sign prediction in transform domain.

The exemplary implementation of the embodiments described above in an encoder such as that of FIG. 1 is shown in FIG. 9. In particular, a newly introduced module 122 performs sign prediction and a modified module 970 performs entropy encoding.

Positions of signs to be encoded using CABAC context are defined based on magnitudes of quantized coefficients, and therefore, sign prediction 122 uses the result of quantization process 108. The entropy encoding module 970 may include the following modifications:

Sign prediction error 123 is encoded instead of sign values for the set of M given positions within a block of quantized transform coefficients 109.

New contexts are introduced that are applied to encode the sign prediction error 123 in the entropy encoder 970, resulting in the output 971.

In addition, according to an embodiment, context for the entropy coding is selected in accordance with the transformation applied in block 106 and possibly further criteria as described above.

Figure 10:
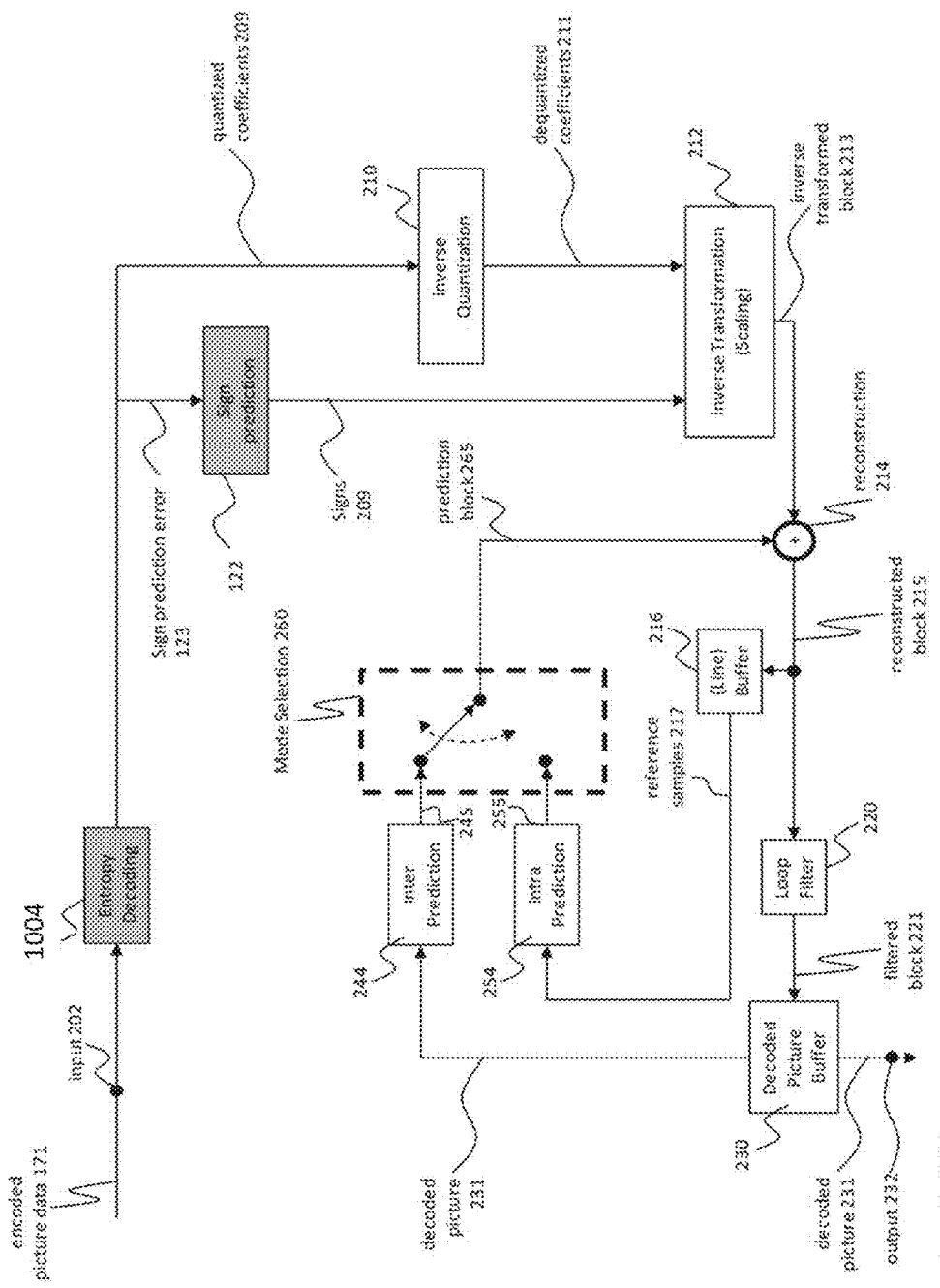
FIG. 10 is a block diagram illustrating an exemplary amendment of the decoder according to FIG. 2 to include the sign prediction in transform domain.

The exemplary implementation of the embodiments described above in a decoder such as that of FIG. 2 is shown in FIG. 10.

The decoder in FIG. 10 has the corresponding new sign prediction module 122 and a modified entropy decoding module 1004. For example, in some embodiments, the entropy decoding may be performed based on a context selected in accordance with the transformation applied in block 106 and possibly further criteria as described above.

In particular, the entropy decoding module 1004 parses from the stream coefficients as well as further syntax elements possibly used by the sign prediction. Thus, the decoding module 1004 may perform step 1400. Based on the parsed information, prediction of the coefficient signs is performed in block 122, which may perform step of sign prediction 1420. Based on the prediction (not visually indicated in FIG. 10), the entropy decoding module 1004 may further select the context 1440, deconde the sign prediction error using the context 1460 and reconstruct the sign values 1480.

Sign prediction module 122 is substantially the same as the one being used at the encoder side at least in respect of the sign prediction calculation (cf. FIG. 9) but uses the prediction error signal 123 parsed from the bitstream 971. The sign prediction 123 restores some (M) of the signs of the quantized transform coefficients 209 located at the (M) positions defined by the distribution of magnitudes within a block of quantized transform coefficients 209. During the parsing process (entropy decoding 1004), only the sign prediction error signal 123 is restored but not the signs themselves. The present embodiments do not introduce parsing dependency, because actual sign values and positions can be restored from prediction error signal 123 after the parsing process 1004 is complete, specifically, in parallel with inverse quantization process 210.

The parsed sign prediction error 123 is added to the predicted signs in the block 122, resulting in the decoded (reconstructed) signs 209. The predicted signs are obtained in the same way as at the encoder, using only the already decoded adjacent blocks and testing K hypotheses for M signs.

Note that this specification provides explanations for pictures (frames), but fields substitute as pictures in the case of an interlace picture signal.

Although embodiments of the disclosure have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Embodiments of the disclosure may further comprise an apparatus, e.g. encoder and/or decoder, which comprises a processing circuitry configured to perform any of the methods and/or processes described herein.

Embodiments of the encoder 100 and/or decoder 200 and other embodiments may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the disclosure comprises or is a computer program comprising program code for performing any of the methods described herein, when executed on a computer.

An embodiment of the disclosure comprises or is a computer readable non-transitory medium comprising a program code that, when executed by a processor, causes a computer system to perform any of the methods described herein.

According to an embodiment, an apparatus is provided for decoding an image block including processing circuitry configured to: predict signs of a plurality of coefficients of a transformed image block based on a cost function including transformed difference between adjacent pixels neighboring the transformed image block and prediction of the adjacent pixels calculated based on a prediction signal of the image block; and reconstruct the signs of the plurality of coefficients according to the predicted signs.

In an exemplary implementation, the processing circuitry is further configured to: parse from a coded stream sign prediction error; reconstruct the signs including adding to the predicted signs the parsed sign prediction error.

For example, the cost function includes a sum of squared transformed differences between the adjacent pixels neighboring the transformed image block and the prediction of the adjacent pixels calculated based on a prediction signal of the image block.

Moreover, in one implementation, the processing circuitry is further configured to predict the signs of the plurality of coefficients of a transformed image block including:
    calculating the transformed difference between the adjacent pixels neighboring the transformed image block and the prediction of the adjacent pixels calculated based on a prediction signal of the image block; calculating cost function comprising a sum of squared transformed differences between said transformed difference and the transformed image block reconstructed according to each hypothesis of the signs out of a set of hypotheses; select as the predicted signs that hypothesis of the signs which minimize the cost given by the cost function.

For instance, in the transformed image block is reconstructed by adding the hypothesis of the signs to coefficients parsed from a coded stream.

In particular, the cost function F may be given by: $F=\Sigma_{n=0}^{N-1}(t_n-q_n)^2+\Sigma_{m=0}^{M-1}(v_m-o_m)^2$, with $t_n$=Trans1D $(T_n)$, $q_n$=Trans1D$(Q_n)$, $v_n$=Trans1D$(V_n)$, and $o_n$=Trans1D $(O_n)$, wherein Trans1D$(\cdot)$ is a one-dimensional orthogonal transform and $T_n=[2X_{n,-1}-_{n,-2}-P_{n,0}]$, $V_m=[2Z_{-1,m}-Z_{-2,m}-P_{0,m}]$, $Q_n=R_{n,0}$ and $O_m=R_{0,m}$, wherein P is prediction signal, and X and Y are neighboring pixels, N and M being height and width of the block in which the signs are predicted, respectively.

In an exemplary implementation, the adjacent pixels are located at a horizontal and a vertical boundary of the image block.

In some embodiments, the processing circuitry is further configured to decode the sign prediction error using Context-Adaptive Binary Arithmetic Coding, CABAC.

According to an embodiment, an apparatus is provided for encoding an image block including processing circuitry configured to: predict signs of a plurality of coefficients of a transformed image block based on a cost function including transformed difference between adjacent pixels neighboring the transformed image block and prediction of the adjacent pixels calculated based on a prediction signal of the image block; and encode the signs of the plurality of coefficients according to the predicted signs.

According to an embodiment, the apparatus for encoding an image block according to claim 9, wherein the processing circuitry is further configured to encode the signs of the plurality of coefficients including: determining sign prediction error as a difference between the signs of the plurality of coefficients and the predicted signs of the plurality of coefficients; inserting into a coded stream including the coded image block the determined sign prediction error.

For instance, the cost function includes a sum of squared transformed differences between the adjacent pixels neighboring the transformed image block and the prediction of the adjacent pixels calculated based on a prediction signal of the image block.

In one exemplary implementation, the apparatus for decoding an image block according to any of claims 9 to 11, wherein the processing circuitry is further configured to predict the signs of the plurality of coefficients of a transformed image block including: calculating the transformed difference between the adjacent pixels neighboring the transformed image block and the prediction of the adjacent pixels calculated based on a prediction signal of the image block; calculating cost function comprising a sum of squared transformed differences between said transformed difference and the transformed image block reconstructed according to each hypothesis of the signs out of a set of hypotheses; and select as the predicted signs that hypothesis of the signs which minimize the cost given by the cost function.

For example, the cost function F is given by:

$$F = \sum_{n=0}^{N-1}(t_n - q_n)^2 + \sum_{m=0}^{M-1}(v_m - o_m)^2,$$

with $t_n$=Trans1D$(T_n)$, $q_n$=Trans1D$(Q_n)$, $v_n$=Trans1D$(V_n)$, and $o_n$=Trans1D$(O_n)$, wherein Trans1D$(\cdot)$ is a one-dimensional orthogonal transform and $T_n=[2X_{n,-1}-X_{n,-2}-P_{n,0}]$, $V_m=[2Z_{-1,m}-Z_{-2,m}-P_{0,m}]$, $Q_n=R_{n,0}$ and $O_m=R_{0,m}$, wherein P is prediction signal, and X and Y are neighboring pixels, N and M being height and width of the block in which the signs are predicted, respectively.

Moreover, the adjacent pixels may be located at a horizontal and a vertical boundary of the image block.

The processing circuitry of the decoding apparatus is further configured to: encode the sign prediction error using Context-Adaptive Binary Arithmetic Coding, CABAC.

According to an embodiment, a method is provided for decoding an image block including the steps of: predicting signs of a plurality of coefficients of a transformed image block based on a cost function including transformed difference between adjacent pixels neighboring the transformed image block and prediction of the adjacent pixels calculated based on a prediction signal of the image block; and reconstructing the signs of the plurality of coefficients according to the predicted signs.

According to an embodiment, a method is provided for encoding an image block including the steps of: predicting signs of a plurality of coefficients of a transformed image block based on a cost function including transformed difference between adjacent pixels neighboring the transformed image block and prediction of the adjacent pixels calculated based on a prediction signal of the image block; and reconstructing the signs of the plurality of coefficients according to the predicted signs.

It is noted that the above embodiments, implementations and examples described with reference to the processing circuitries in an encoding or decoding apparatus, are also applicable to the above mentioned encoding and decoding methods, which may correspond to the steps performed by the respective processing circuitries.

Summarizing, the present disclosure provides embodiments for coding and decoding signs of transformation coefficients which is applicable, for instance, in image and/or video coding and decoding. In particular, a plurality of the signs are predicted and only a prediction error signal is embedded in the bitstream. The prediction error signal may have a distribution which can be efficiently coded with CABAC or another variable length (entropy) coding. In order to perform the prediction of the signs efficiently, the signs of a plurality of coefficients of a transformed image block are predicted based on a cost function including transformed difference between adjacent pixels neighboring the transformed image block and prediction of the adjacent pixels calculated based on a prediction signal of the image block. Moreover, the present disclosure provides embodiments for coding and decoding signs of transform coefficients which is applicable, for instance, in image and/or video coding and decoding. In particular, a plurality of the signs are predicted and only a prediction error signal is embedded in the bitstream. The prediction error signal may have a distribution which can be efficiently coded with CABAC or another variable length (entropy) coding. Moreover, if adaptive multi-core transform is used, the context for the entropy code to code a transform coefficient sign is selected according to the transformation which was used to obtain the transform coefficient.

LIST OF REFERENCE SIGNS

FIG. 1
100 Encoder
103 Picture block
102 Input (e.g. input port, input interface)
104 Residual calculation [unit or step]
105 Residual block 106 Transformation (e.g. additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g. additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]
131 Decoded picture
142 Inter estimation (or inter picture estimation) [unit or step]
143 Inter estimation parameters (e.g. reference picture/ reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g. intra prediction mode)
154 Intra prediction (intra frame/picture prediction) [unit or step]
155 Intra prediction block
162 Mode selection [unit or step]
165 Prediction block (either inter prediction block 145 or intra prediction block 155)
170 Entropy encoding [unit or step]
171 Encoded picture data (e.g. bitstream)
172 Output (output port, output interface)
FIG. 2
200 Decoder
171 Encoded picture data (e.g. bitstream)
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
FIG. 3
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data
FIG. 4
410 Current block
420 Reconstructed block
430 Prediction block
440 Prediction error block
FIG. 5:
510 Sorting of signs of coefficients according to absolute level of the coefficient
520 Sign estimation
530 CABAC encoding
540 Bypass encoding
FIG. 6:
610 Current block
620 Neighboring pixel columns
630 Neighboring pixel rows
FIG. 7:
710 Reconstructed block
720 Prediction block in pixel domain
730 Residual block in pixel domain
740 Adjacent block to the left of the current block
750 Difference signal
760 Propagated prediction
770 Adjacent blocks column
790 Current block
FIG. 8:
801 Residuals
802 Context determination
803 Obtaining line(s) of neighboring block(s)
804 Prediction in pixel domain
805 Transformation
806 Sign prediction
807 Evaluation of cost function
808 Coding of sign prediction error
809 Coding of signs without prediction
811 Embedding of coded signs and sign prediction error into the bitstream
FIG. 9:
122 Sign prediction
123 Sign prediction error
970 Entropy coding
971 encoded picture data
FIG. 10:
1004 Entropy decoding
209 Reconstructed signs
FIG. 13:
1300 Transformation/Quantization
1320 Prediction of one or more signs
1340 Calculation of sign prediction error
1360 Selection of context
1380 Entropy coding
FIG. 14:
1400 Parsing bitstream
1420 Prediction of one or more signs
1440 Selection of context
1460 Entropy decoding of sign prediction error
1480 Determining one or more signs

What is claimed is:

1. An apparatus for encoding an image block including processing circuitry configured to:
    predict a sign for each of M non-zero transform coefficients obtained by transforming an image block signal with a plurality of transformations, M being an integer larger than 1 and smaller than a number of non-zero transform coefficients obtained by transforming the image block, wherein the sign prediction is based on a cost function calculated in a transform domain rather than a spatial domain;
    wherein the cost function includes a sum of squared transformed differences between adjacent pixels neighboring a transformed image block and a prediction of the adjacent pixels calculated based on a prediction signal of the image block;
    determine a sign prediction error for each of the M non-zero transform coefficients indicating whether or not the sign was correctly predicted;
    select a context for entropy coding of each sign prediction error of each transform coefficient of the M non-zero transform coefficients according to the plurality of transformations; and
    encode one sign prediction error of one transform coefficient of the M non-zero transform coefficients by applying entropy coding using corresponding selected context,
    wherein fewer than all of the non-zero transform coefficients obtained by transforming the image block signal with the plurality of transformations are used for encoding the image block; and
    wherein the cost function in the transform domain satisfies the following:

$$F = \sum_{n=0}^{N-1}(t_n - q_n)^2 + \sum_{m=0}^{M-1}(v_m - o_m)^2,$$

wherein $t_n$=Trans1D($T_n$), $q_n$=Trans1D($Q_n$), $v_n$=Trans1D($V_n$), and $o_n$=Trans1D($O_n$),
    wherein F is the cost function, Trans1D(·) is a one-dimensional orthogonal transform and $T_n$=[2$X_{n,-1}$−$X_{n,-2}$−$P_{n,0}$], $V_m$=[2$Z_{-1,m}$−$Z_{-2,m}$−$P_{0,m}$], $Q_n$=$R_{n,0}$ and $O_m$=$R_{0,m}$,
    wherein P is prediction signal, X and Z are neighboring pixels, N and M are height and width of the block in which the signs are predicted, and R is a prediction error pixel, respectively.

2. The apparatus according to claim 1, wherein the processing circuitry is further configured to:
    select the context based on an unsigned value of each transform coefficient of the M non-zero transform coefficients.

3. The apparatus according to claim 1, wherein the processing circuitry configured to select a context comprises processing circuitry configured to:
    divide the M non-zero transform coefficients into two lists, the two lists being divided from each other by a threshold such that a first list includes the non-zero transform coefficients having absolute values greater than the threshold and a second list includes the non-zero transform coefficients having absolute values equal to or below the threshold; and
    select a context for entropy coding of each sign prediction error of each transform coefficient of the M non-zero transform coefficients according to whether the transform coefficient of the M non-zero transform coefficients belongs to the first list or the second list.

4. The apparatus according to claim 1, wherein the processing circuitry is further configured to:
    select the context based on whether a prediction type of the image block is intra prediction or inter prediction.

5. The apparatus according to claim 1, wherein the processing circuitry is further configured to:
    based on a prediction type of the image block being an intra prediction mode, select the context based on the intra prediction mode used to predict the image block.

6. The apparatus according to claim 1, wherein the processing circuitry is further configured to:
    predict the sign for each of the M non-zero transform coefficients based on a cost function including estimating a discontinuity along the boundary of the image block; and
    select the context based on a number of block sides or a number of neighboring pixels available for the estimating of the discontinuity along the boundary of the image block.

7. The apparatus according to claim 6, wherein the processing circuitry is further configured to:
    select the context based on a ratio of edge pixels available for estimating the discontinuity to a total number of pixels belonging to the image block.

8. The apparatus according to claim 1, wherein the processing circuitry is further configured to:
    select the context based on whether or not the image block is located at a left boundary or a top boundary of a slice in which the image block is located.

9. The apparatus according to claim 1, wherein the processing circuitry is further configured to:
    predict the image block using a DC intra-prediction mode or a planar mode; and
    select the context based on whether the image block is predicted using the DC intra-prediction mode or the planar mode.

10. The apparatus according to claim 1, wherein each of the plurality of transformations is associated with one of a plurality of contexts, and the processing circuitry is further configured to:
    select the context out of the plurality of contexts such that the one of the plurality of transformations is associated with the selected context.

11. The apparatus according to claim 10, wherein the processing circuitry is further configured to:
    select a context for entropy coding of each sign prediction error of each transform coefficient of the M non-zero transform coefficients according to the plurality of transformations each associated with one of the plurality of contexts, wherein when
    the probabilities of correctly predicted sign values of a first transformation of the plurality of transformations and a second transformation of the plurality of transformations differ by less than a predetermined value, the first transformation is associated with a same context as the second transformation.

12. The apparatus according to claim 1, wherein the processing circuitry is further configured to:
    predict a sign for each of the M non-zero transform coefficients obtained by transforming the image block signal with the plurality of transformations, wherein the plurality of transformation includes a horizontal transformation and a vertical transformation; and the selection of the context is based on a combination of the horizontal transformation and the vertical transformation.

13. The apparatus according to claim 12, wherein each of the plurality of transformations is a combination of a horizontal transformation and a vertical transformation, and the processing circuitry is further configured to:
select the context such that the combination of the horizontal transformation and the vertical transformation is associated with the selected context.

14. The apparatus according to claim 12, wherein:
a number of mutually different contexts of combinations of vertical transformations and horizontal transformations is smaller than a number of combinations of vertical and horizontal transformations, and
a first combination of a vertical transformation and a horizontal transformation is associated with a same context as a second combination of a vertical transformation and a horizontal transformation.

15. The apparatus according to claim 1, wherein the processing circuitry is further configured to use context-adaptive binary arithmetic coding (CABAC) for the entropy coding.

16. An apparatus for decoding an image block from a bitstream, the apparatus including processing circuitry configured to:
predict a sign for each of M non-zero transform coefficients to be inverse transformed to obtain an image block signal with a plurality of transformations, M being an integer larger than 1 and smaller than a number of non-zero transform coefficients obtained by transforming the image block, wherein the sign prediction is based on a cost function calculated in a transform domain rather than a spatial domain;
wherein the cost function includes a sum of squared transformed differences between adjacent pixels neighboring a transformed image block and a prediction of the adjacent pixels calculated based on a prediction signal of the image block;
select a context for entropy decoding of a sign prediction error of a transform coefficient of the M non-zero transform coefficients indicating whether or not signs were correctly predicted for the M non-zero transform coefficients according to the plurality of transformations;
decode the sign prediction error of the transform coefficient of the M non-zero transform coefficients by applying entropy decoding using the selected context; and
determine a sign of the transform coefficient of the M non-zero transform coefficients based on the predicted sign of the transform coefficient of the M non-zero transform coefficients and the decoded sign prediction error of the transform coefficient of the M non-zero transform coefficients,
wherein fewer than all of the non-zero transform coefficients obtained by transforming the image block signal with the plurality of transformations are used for encoding the image block, and
wherein the cost function in the transform domain satisfies the following:

$$F = \sum_{n=0}^{N-1} (t_n - q_n)^2 + \sum_{m=0}^{M-1} (v_m - o_m)^2,$$

wherein $t_n$=Trans1D($T_n$), $q_n$=Trans1D($Q_n$), $v_n$=Trans1D($V_n$), and $o_n$=Trans1D($O_n$), wherein F is the cost function, Trans1D(·) is a one-dimensional orthogonal transform and $T_n$=[$2X_{n,-1}$−$X_{n,-2}$−$P_{n,0}$], $V_m$=[$2Z_{-1,m}$−$Z_{-2,m}$−$P_{0,m}$], $Q_n$=$R_{n,0}$ and $O_m$=$R_{0,m}$,
wherein P is prediction signal, X and Z are neighboring pixels, N and M are height and width of the block in which the signs are predicted, and R is a prediction error pixel, respectively.

17. A method for encoding an image block including the steps of:
predicting a sign for each of M non-zero transform coefficients obtained by transforming an image block signal with a plurality of transformations, M being an integer larger than 1 and smaller than a number of non-zero transform coefficients obtained by transforming the image block, wherein the sign prediction is based on a cost function calculated in a transform domain rather than a spatial domain;
wherein the cost function includes a sum of squared transformed differences between adjacent pixels neighboring a transformed image block and a prediction of the adjacent pixels calculated based on a prediction signal of the image block;
determining a sign prediction error for each of the M non-zero transform coefficients indicating whether or not the sign was correctly predicted;
selecting a context for entropy coding of each sign prediction error of each transform coefficient of the M non-zero transform coefficients according to the plurality of transformations; and
encoding one sign prediction error of one transform coefficient of the M non-zero transform coefficients by applying entropy coding using corresponding selected context,
wherein fewer than all of the non-zero transform coefficients obtained by transforming the image block signal with the plurality of transformations are used for encoding the image block, and
wherein the cost function in the transform domain satisfies the following:

$$F = \sum_{n=0}^{N-1} (t_n - q_n)^2 + \sum_{m=0}^{M-1} (v_m - o_m)^2,$$

wherein $t_n$=Trans1D($T_n$), $q_n$=Trans1D($Q_n$), $v_n$=Trans1D($V_n$), and $o_n$=Trans1D($O_n$),
wherein F is the cost function, Trans1D(·) is a one-dimensional orthogonal transform and $T_n$=[$2X_{n,-1}$−$X_{n,-2}$−$P_{n,0}$], $V_m$=[$2Z_{-1,m}$−$Z_{-2,m}$−$P_{0,m}$], $Q_n$=$R_{n,0}$ and $O_m$=$R_{0,m}$,
wherein P is prediction signal, X and Z are neighboring pixels, N and M are height and width of the block in which the signs are predicted, and R is a prediction error pixel, respectively.

18. A program code stored on a non-transitory computer-readable medium comprising instructions which when executed on a processor perform all steps of the method according to claim 17.

19. A method for decoding an image block from a bitstream including the steps of:
predicting a sign for each of M non-zero transform coefficients to be inverse transformed to obtain an image block signal using a plurality of transformations, M being an integer larger than 1 and smaller than a number of non-zero transform coefficients obtained by transforming the image block, wherein the sign prediction is based on a cost function calculated in a transform domain rather than a spatial domain;

wherein the cost function includes a sum of squared transformed differences between adjacent pixels neighboring a transformed image block and a prediction of the adjacent pixels calculated based on a prediction signal of the image block;

selecting a context for entropy decoding of a sign prediction error of a transform coefficient of the M non-zero transform coefficients indicating whether or not signs were correctly predicted for the M non-zero transform coefficients according to the plurality of transformations;

decoding the sign prediction error of the transform coefficient of the M non-zero coefficients by applying entropy decoding using the selected context; and determining a sign of the transform coefficient of the M non-zero transform coefficients based on the predicted sign of the transform coefficient of the M non-zero transform coefficients and the decoded sign prediction error of the transform coefficient of the M non-zero transform coefficients, wherein fewer than all of the non-zero transform coefficients obtained by transforming the image block signal with the plurality of transformations are used for encoding the image block, and wherein the cost function in the transform domain satisfies the following:

$$F = \sum_{n=0}^{N-1}(t_n - q_n)^2 + \sum_{m=0}^{M-1}(v_m - o_m)^2,$$

wherein $t_n$=Trans1D($T_n$), $q_n$=Trans1D($Q_n$), $v_n$=Trans1D($V_n$), and $o_n$=Trans1D($O_n$), wherein F is the cost function, Trans1D(·) is a one-dimensional orthogonal transform and $T_n=[2X_{n,-1}-X_{n,-2}-P_{n,0}]$, $V_m=[2Z_{-1,m}-Z_{-2,m}-P_{0,m}]$, $Q_n=R_{n,0}$ and $O_m=R_{0,m}$, wherein P is prediction signal, X and Z are neighboring pixels, N and M are height and width of the block in which the signs are predicted, and R is a prediction error pixel, respectively.

* * * * *

UNITED STATES PATENT AND TRADEMARK OFFICE
CERTIFICATE OF CORRECTION

PATENT NO. : 11,856,216 B2
APPLICATION NO. : 16/994076
DATED : December 26, 2023
INVENTOR(S) : Filippov et al.

Page 1 of 1

It is certified that error appears in the above-identified patent and that said Letters Patent is hereby corrected as shown below:

On the Title Page

The following foreign application priority data section should be added:
-- Foreign Application Priority Data
March 7, 2018 (RU) ........................ PCT/RU2018/000142 --.

Signed and Sealed this
Nineteenth Day of March, 2024

Katherine Kelly Vidal
*Director of the United States Patent and Trademark Office*